United States Patent
Kato et al.

(10) Patent No.: US 10,075,239 B2
(45) Date of Patent: Sep. 11, 2018

(54) REPRODUCTION DEVICE, METHOD, STORAGE MEDIUM, AND SYSTEM

(71) Applicant: FUJITSU LIMITED, Kawasaki-shi, Kanagawa (JP)

(72) Inventors: Keizo Kato, Kawasaki (JP); Kensuke Kuraki, Ichikawa (JP); Ryuta Tanaka, Machida (JP); Akira Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/461,845

(22) Filed: Mar. 17, 2017

(65) Prior Publication Data

US 2017/0195047 A1    Jul. 6, 2017

Related U.S. Application Data

(63) Continuation of application No. PCT/JP2014/004858, filed on Sep. 22, 2014.

(51) Int. Cl.
*H04B 10/00*  (2013.01)
*H04B 10/116* (2013.01)
*H04B 10/50*  (2013.01)
*H04N 9/68*   (2006.01)
*H04N 9/04*   (2006.01)
*H04J 14/00*  (2006.01)

(52) U.S. Cl.
CPC ......... *H04B 10/116* (2013.01); *H04B 10/502* (2013.01); *H04N 9/045* (2013.01); *H04N 9/68* (2013.01)

(58) Field of Classification Search
CPC ... H04B 10/11; H04B 10/114; H04B 10/1141; H04B 10/1143; H04B 10/116
See application file for complete search history.

(56) References Cited

U.S. PATENT DOCUMENTS

| 5,061,998 A | 10/1991 | Yasuki et al. |
| 2010/0034540 A1 | 2/2010 | Togashi |
| 2011/0200338 A1 | 8/2011 | Yokoi |

(Continued)

FOREIGN PATENT DOCUMENTS

| CN | 102480322 | 5/2012 |
| EP | 2 205 002 A1 | 7/2010 |

(Continued)

OTHER PUBLICATIONS

Extended European Search Report dated Sep. 4, 2017 from European Patent Application No. 14902690.8, 6 pages.

(Continued)

*Primary Examiner* — Daniel Dobson
(74) *Attorney, Agent, or Firm* — Staas & Halsey LLP

(57) ABSTRACT

A reproduction device is configured to receive light emitted based on a plurality of signals having a specific amplitude in a specific color space on which information is superimposed, and to reproduce the information based on the received light. The reproduction device includes: a memory; and a processor coupled to the memory and configured to: generate a plurality of signals in the specific color space from the received light, correct the generated plurality of signals based on the specific amplitude, and acquire the information based on the corrected plurality of signals.

19 Claims, 21 Drawing Sheets

(56) References Cited

U.S. PATENT DOCUMENTS

| | | |
|---|---|---|
| 2011/0299857 A1 | 12/2011 | Rekimoto |
| 2012/0128366 A1* | 5/2012 | Lee .................... H04B 10/1121 398/118 |
| 2012/0275796 A1 | 11/2012 | Yokoi |

FOREIGN PATENT DOCUMENTS

| | | |
|---|---|---|
| EP | 2 456 100 A1 | 5/2012 |
| JP | 3-10483 | 1/1991 |
| JP | 2001-203609 | 7/2001 |
| JP | 2008-252570 | 10/2008 |
| JP | 2009-538071 | 10/2009 |
| JP | 2010-98574 | 4/2010 |
| JP | 2011-29871 | 2/2011 |
| JP | 2011-114634 | 6/2011 |
| JP | 2011-254317 | 12/2011 |
| JP | 2012-114911 | 6/2012 |
| WO | WO 2007/135014 A1 | 11/2007 |
| WO | WO 2009/136312 A1 | 11/2009 |
| WO | 2011/070473 A1 | 6/2011 |

OTHER PUBLICATIONS

Shinichiro Haruyama, "Visible Light Communication", IEICE Transactions on Information and System, vol. J86-A, No. 12, pp. 1284-1291, Dec. 2003.

Fujitsu Limited, "Development of New Communication Technique Enabling Information to Be Acquired by Simply Capturing TV Video Image with Mobile Phone", Jun. 4, 2012, pp. 1-4.

International Search Report dated Oct. 28, 2014 in corresponding International Patent Application No. PCT/JP2014/004858.

Chinese Office Action dated Jul. 10, 2018 from Chinese Patent Application No. 201480082074.2, 14 pages.

\* cited by examiner

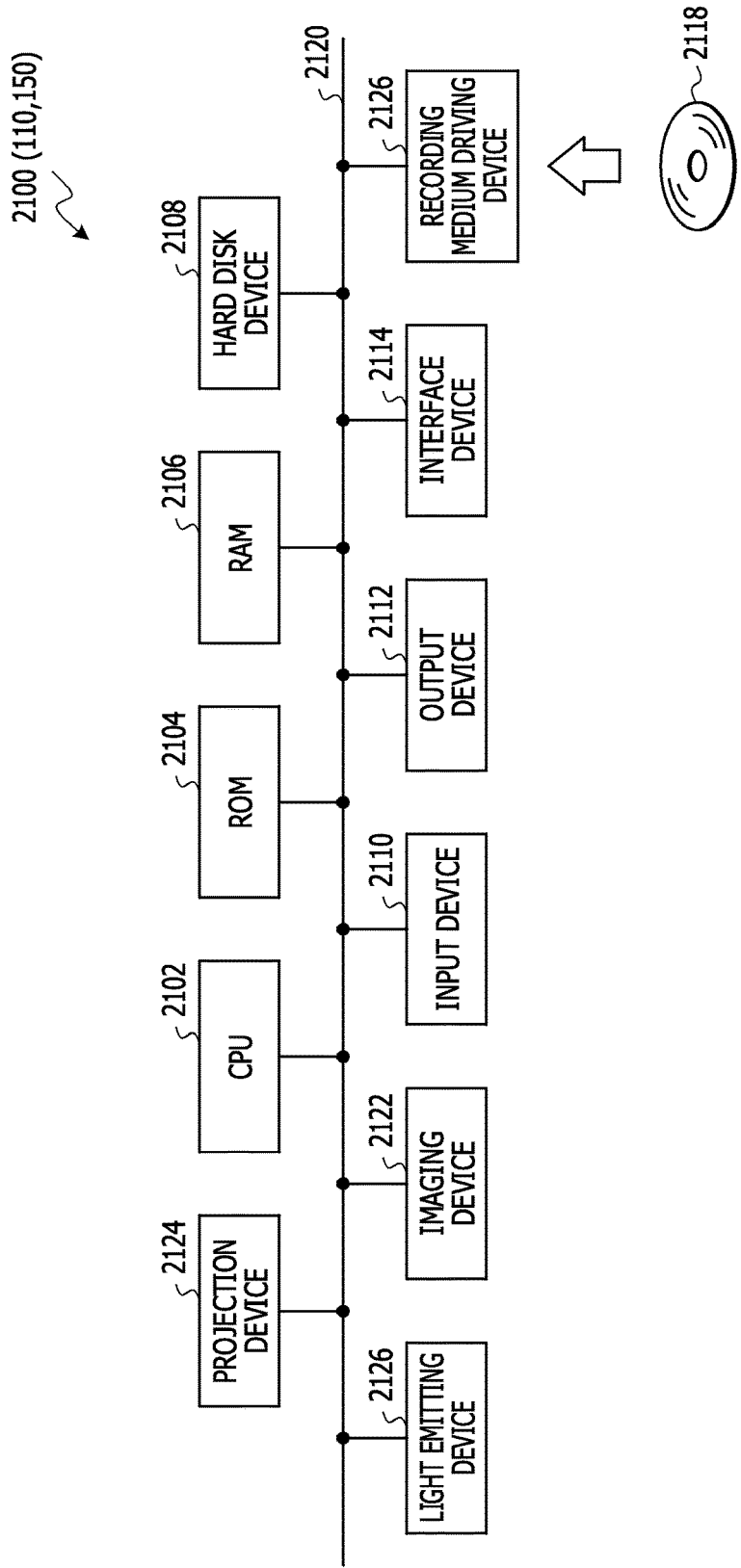

REPRODUCTION DEVICE, METHOD, STORAGE MEDIUM, AND SYSTEM

CROSS-REFERENCE TO RELATED APPLICATION

This application is a continuation application of International Application PCT/JP2014/004858 filed on Sep. 22, 2014 and designated the U.S., the entire contents of which are incorporated herein by reference.

FIELD

The embodiments discussed herein are relates to a reproduction device, a method, a storage medium, and a system.

BACKGROUND

As an illuminating light source, a light emitting diode (LED) is widely used. The LED has a feature that a response speed is faster than that of an incandescent electric lamp or a fluorescent lamp. By using the feature, a visible light communication technology performing communication so as to superimpose information on illuminating light emitted from the LED by causing the LED to blink at a speed which may not be recognized by human eyes is studied. The visible light communication is researched to be used for a communication purpose in a place where the use of electric waves is limited, used for information distribution limited to a range where light such as indoor light reaches, used in intelligent transport systems (ITS), or the like.

An information transmission system including light emitting means for transmitting information through lighting a predetermined region and light receiving means for decoding the information from an image obtained by imaging the predetermined region in a time-series manner is proposed. In the information transmission system, the predetermined region emits color-modulated light by converting information into at least three levels depending on the information and the light receiving means decodes the information based on the converted color-modulated information of the predetermined region. In addition, an optical module which includes at least two primary light sources for emitting a primary color light and which incorporates data into light by modulating a color coordination of the light to be emitted from the primary light sources according to embedded data is proposed. Furthermore, there are various proposals using the features of the visible light communication.

Examples of the related art include Japanese Laid-open Patent Publication No. 3-10483, International Publication Pamphlet No. WO2009/136312, Japanese Laid-open Patent Publication No. 2011-114634, Japanese Laid-open Patent Publication No. 2010-98574, Japanese Laid-open Patent Publication No. 2011-29871, Shinichiro HARUYAMA, "Visible Light Communication", IEICE Transactions on Information and System, Vol. J86-A, No. 12, pp. 1284 to 1291, December 2003, and Fujitsu Limited, "Development of New Communication Technique enabling Information to be acquired by simply imaging TV Video with Mobile Phone", Jun. 4, 2012.

SUMMARY

According to an aspect of the embodiments, a reproduction device is configured to receive light emitted based on a plurality of signals having a specific amplitude in a specific color space on which information is superimposed, and to reproduce the information based on the received light. The reproduction device includes: a memory; and a processor coupled to the memory and configured to: generate a plurality of signals in the specific color space from the received light, correct the generated plurality of signals based on the specific amplitude, and acquire the information based on the corrected plurality of signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 21 illustrates a hardware configuration of a reproduction device and an illuminating device of an example.

DESCRIPTION OF EMBODIMENTS

There is a case where information may not be satisfactorily reproduced when information is reproduced from light on which the information is superimposed.

An object of the embodiments is to provide a reproduction device capable of satisfactorily reproducing the information from the light on which the information is superimposed.

Figure 1:
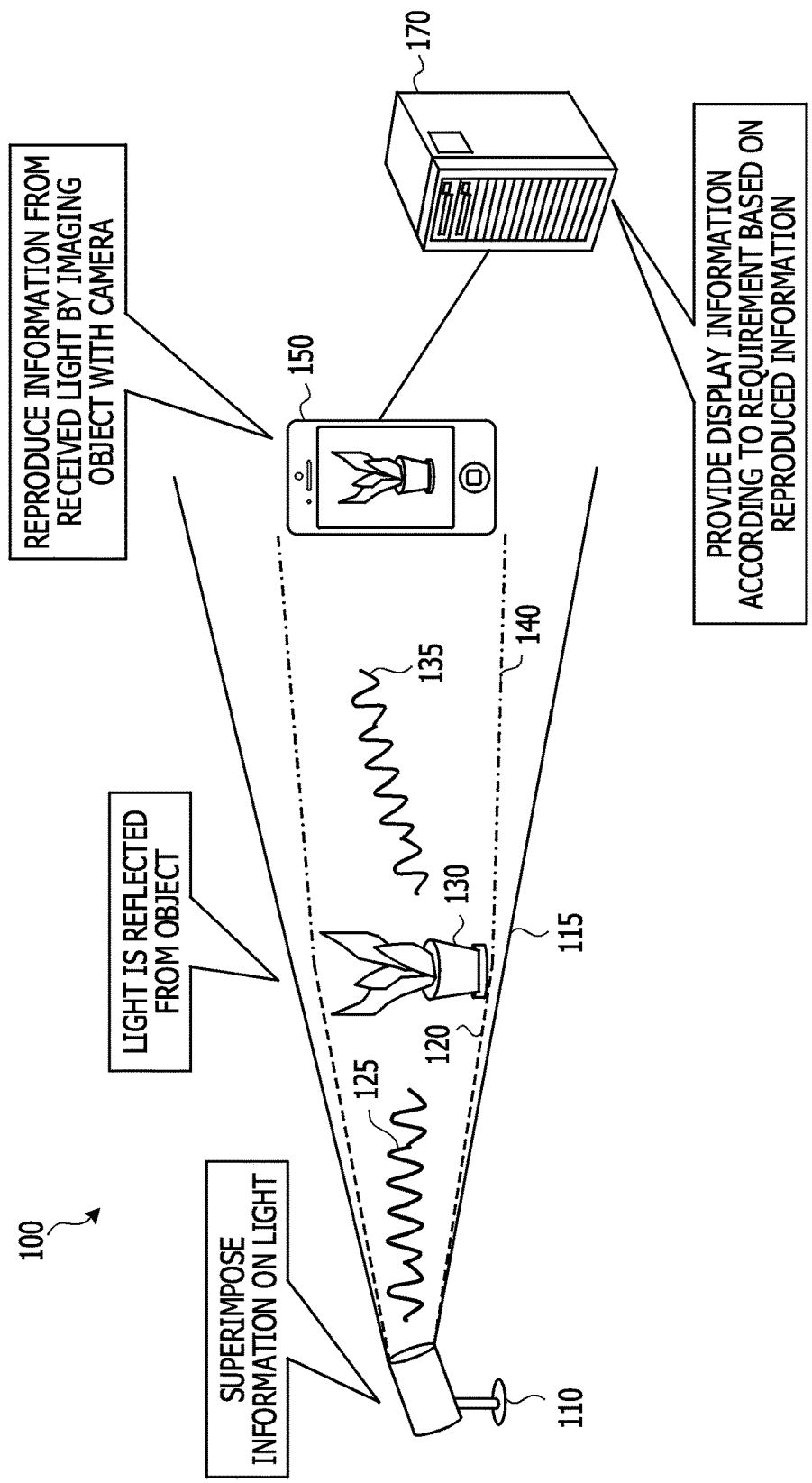
FIG. 1 illustrates an information distribution system of an embodiment.

FIG. 1 illustrates an information distribution system of an embodiment. An information distribution system 100 illustrated in FIG. 1 includes an illuminating device 110, an object 130, a reproduction device 150, and a server device 170.

The illuminating device 110 includes, for example, a light emitting element (for example, LED) corresponding to each component of RGB. A specific information 125 is superimposed on an illuminating light 115 (solid line) emitted from the illuminating device 110 by controlling a light emission amount of a phase of the light emitting element as a watermark signal.

The object 130 is irradiated with at least a part of the illuminating light 115 as an irradiation light 120 (dotted line), and a reflected light 140 (dashed-dotted line) due to the reflection of the irradiation light 120 by the object 130 is received by the reproduction device 150.

The reproduction device 150 includes an imaging unit (camera) and the object 130 or the like is imaged according to the received light received by the imaging unit. Although details will be described later, the reproduction device 150 images the object 130 and reproduces the specific information 125 from information 135 included in the reflected light 140 from the received light.

Although omitted for the sake of description, generally, in the received light to be received by the reproduction device 150, the illuminating light 115 which is emitted from the illuminating device 110 or the reflected light reflected by other than the object 130 in addition to the reflected light 140 by the object 130.

The specific information 125 to be superimposed on the illuminating light 115 to be emitted from the illuminating device 110 is information associated with the object 130 to be irradiated with the illuminating light 115 or information desired to be acquired through the received light in a case where the reproduction device 150 receives the reflected light 140 in accordance with the object 130 even if it is unrelated to the object 130.

For example, the information corresponds to various information items such as information or a coupon relating to a product or an advertisement in a case where the object 130 is the product or the advertisement, an explanation content for explaining information relating to the object 130, or an explanation content or an instruction content relating to a scheduled operation to be performed in relation to the object 130.

If there is a case where the specific information is displayed on a display unit of the reproduction device 150, the object 130 or the other object is projected by a projection unit of the reproduction device 150 in some cases.

The specific information 125 may be information for specifying the other information desired to be acquired on the reproduction device 150. For example, the specific information may be an ID for specifying the other information, or may be information for specifying a URL for acquiring the other information.

The server device 170 holds the other information, the reproduction device 150 designates the ID or the URL corresponding to the specific information 125 which is acquired by reproducing the information 135 to access to the server device 170 through a wired or wireless network and acquires the other information as a response from the server device 170 for access.

In a case where the specific information 125 to be superimposed on the illuminating light 115 to be emitted from the illuminating device 110 is information for specifying the other information desired to be obtained by the reproduction device 150, desired information is finally acquired by the reproduction device 150, and an amount of information to be imposed on the illuminating light 115 in the illuminating device 110 can be reduced.

In a case where the information is displayed on the reproduction device 150 using the information distribution system 100 or in a case where the other information is acquired from the server device 170, a service such as charging may be carried out.

In general, the object 130 has a specific spectral reflectivity. For example, in a case where the object 130 has a characteristic of absorbing a wavelength region corresponding to red in a visible region, the reflected light 140 of the light by the object 130 is affected by the spectral reflectivity of the object 130 and the component of the wavelength region corresponding to the red of the visible region is reduced as compared with the irradiation light 120.

That is, if the objects reflecting the irradiation light 120 are different from each other, since the irradiation light 120 is reflected under the influence of the different spectral reflectivity, a ratio each component of a RGB color space included in the reflected light 140 is different from the ratio of the irradiation light 120.

Accordingly, even if information items which are superimposed on the irradiation light 120 emitted from the illuminating device 110 are the same, that is, even if ratios of components of the RGB color space included in the irradiation light 120 are the same, when the objects reflecting the irradiation light 120 are different from each other the ratio of each component of the RGB color space to be included in the reflected light 140 is changed. Accordingly, the information to be superimposed on the reflected light 140 is not desired information in some cases.

Although the details will be described, the inventors are found that in a case where the specific information 125 superimposed on the illuminating light 115 reaches the reproduction device 150 through the object 130, the specific information 125 may not be satisfactorily reproduced from the information 135 without considering that the reflected light 140 affected in accordance with the spectral reflectivity of the object 130 is received by the reproduction device 150.

Figure 2:
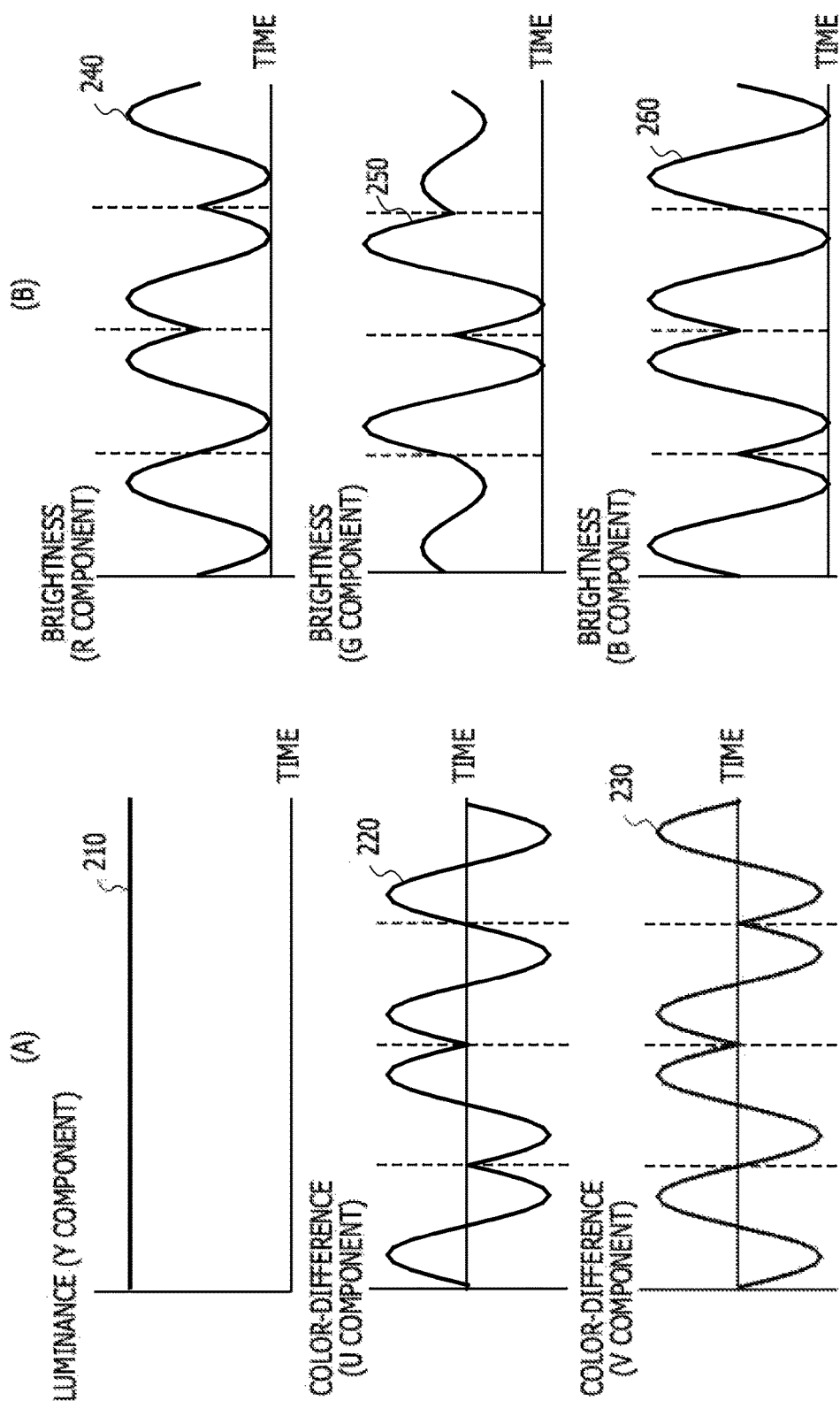
FIG. 2 illustrates an example of light on which specific information is superimposed in the embodiment.

(A) of FIG. 2 illustrates an example of light on which specific information is superimposed in the embodiment. In the illuminating device 110, FIG. 2 illustrates an example of a relationship between a time variation (A) of a value of each component in a YUV color space and a time variation (B) of a value of each component in the RGB color space for explaining the illuminating light 115 in a case where the specific information 125 is superimposed on each component by modulating a U component and a V component in the YUV color space according to the specific information 125, and the specific information is generated by converting the value of each component in the YUV color space to each component of the RGB color space by substituting the value into Conversion Equations (1) to (3) to be described below. The example illustrated in FIG. 2 is an example associated with each embodiment to be described. A waveform included in each interval separated by a dotted line in graphs 220, 230, 240, 250, and 260 is exemplified as a waveform corresponding to a symbol (for example, "0" and "1") which is a minimum unit of information to be superimposed on a signal.

In (A) of FIG. 2, a value of each component in the YUV color space in accordance with the specific information 125 is illustrated. As illustrated in the top graph 210, a Y component, that is, a luminance component is held steady regardless of the passage of time. On the other hand, as illustrated in the middle graph 220, a value of the U component that is one of the color-difference components is phase-modulated according to the specific information 125 and changed with the elapse of time. Similarly, as illustrated in the bottom graph 230, a value of a V component that is the color-difference component is phase-modulated according to the specific information 125 and changed with the elapse of time.

On the other hand, in (B) of FIG. 2, a value of each component in the RGB color space corresponding to (A) of FIG. 2 is illustrated. In the graphs 240, 250, and 260, time variations of a red component, a green component, and a blue component are illustrated, respectively, and the time variation of each color component is obtained by carrying out conversion to the RGB color space for the plurality of color-difference signal in the YUV color space on which the specific information 125 is superimposed. The illuminating device 110 causes the light emitting element corresponding to the color component to emit the light at an amount of the emitted light per unit time according to the value at each sampling point in time variation of each color component.

Although exemplified along the YUV color space in FIG. 2, the invention is not limited thereto. For example, the color space is a color space representing the color with the luminance component and the other component, may be the RGB color space, and may be, for example, a HLS color space which is mutually exchanged by a specific conversion equation.

In addition, a case where the Y component in the YUV color space is not modulated in FIG. 2. However, the invention is not limited thereto. In a case where information is superimposed on the light, the light is modulated according to the information. However, sensitivity to the color in a human eye color is lower than sensitivity to change in brightness. By setting the luminance component at a steady level and modulating the U component or the V component that is the color-difference components, the information can be embedded into the emitting light without deteriorating the function as lighting.

In addition, it is preferable that the values of the U component and the V component is determined such that a fluctuation width of the amount of the emitted light per unit time of each light emitting element in the illuminating device 110 is set to be about several percent of the time average value over the period corresponding to one symbol of the amount of the emitted light per time unit of the light emitting element. Accordingly, the time variation which is a characteristic of the light in accordance with the specific information 125 becomes harder to be perceived by a person.

In addition, in also a case where the characteristic of the light chaining along time series according to the specific information 125 is a light quantity per unit time, for example, a plurality of sampling points (for example, 10 to 20 points) may be set in one cycle of the specific information 125 and determine the amount of the emitted light per unit time of the light emitting element at each sampling point according to the specific information 125.

There is a case where a deviation between the amounts of the emitted light assumed when the information is superimposed on each component of the YUV color space and an actual amount of the emitted light occurs due to variations in the characteristic of the light emitting element. In such a case, the amount of the emitted light may be determined in accordance with the information to be superimposed in consideration of the actual variation in the characteristic of the light emitting element. If the influence of the variations in the characteristic of the light emitting element is small, and if the deviation between the assumed amount of the emitted right and the actual amount of the emitted light is negligible, the variations may be regarded as matching.

In the example illustrated in FIG. 2, a case where the specific information 125 is superimposed on the illuminating light 115 by phase-modulating in the YUV color space is exemplified. However, the present invention is not limited thereto.

For example, communication may be performed using a modulation method such as a binary phase shift keying (BPSK) or may be performed using a quadrature phase shift keying (QPSK) or a quadrature amplitude modulation (QAM) with modulation to the amplitude. Regarding the modulation method, any modulation method used for communication or the like by a radio wave may be used.

Furthermore, the information may be multiplexed using a plurality of frequencies, and in this case, the amplitude and the phase for each frequency is calculated by Fourier transformation and the embedded information is detected in the reproduction device 150 in a case where the information is multiplexed and transmitted by modulating the plurality of frequencies perpendicular to each other such as orthogonal frequency division multiplexing (OFDM).

In addition, since a case where the light form the other illuminating device which is disposed around the illuminating device 110 becomes noise and the noise affects the transmission and reception of the information can be considered, one item of information may be diffused into a plurality of frequencies and embedded by using a spread spectrum used in a code division multiple access (CDMA) method.

The reproduction device 150 illustrated in FIG. 1 receives the received light in accordance with the light according to a time transformation illustrated in (B) of FIG. 2. The reproduction device 150 generates a plurality of color-difference signal in which conversion to the YUV color space with respect to the received light is carried out and reproduces the specific information 125 based on the generated plurality of color-difference signal.

Figure 3:
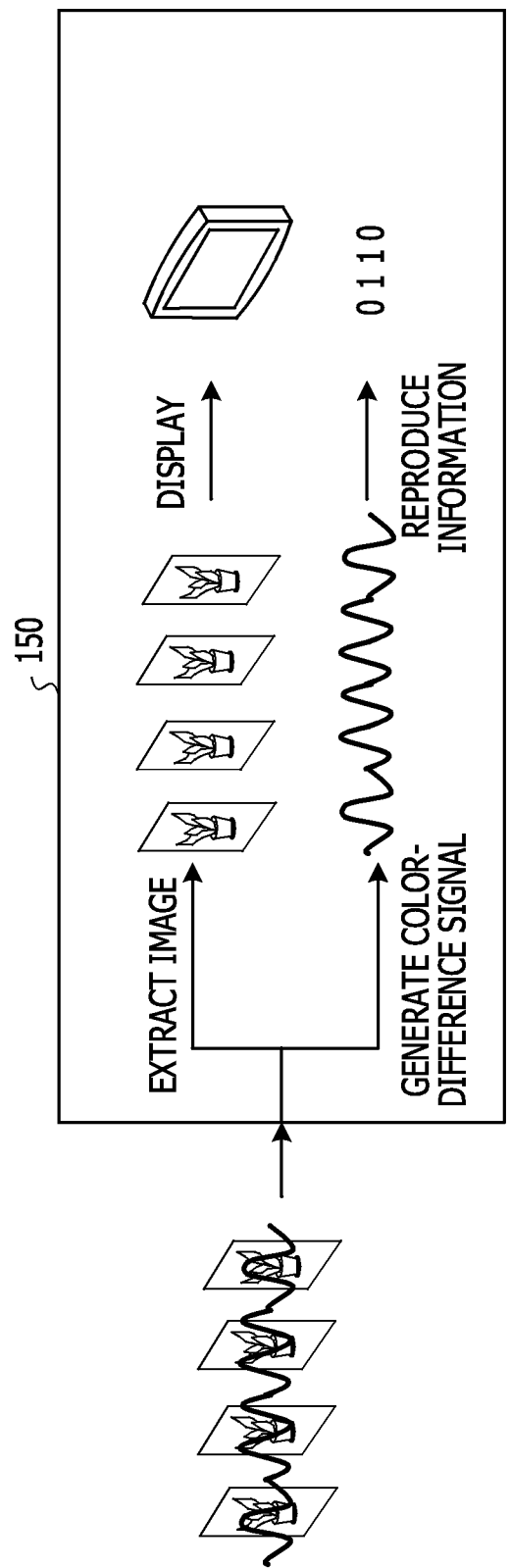
FIG. 3 illustrates an example of a process in a reproduction device of the embodiment.

FIG. 3 illustrates an example of a process in a reproduction device of the embodiment. In FIG. 3, an outline of a process when the specific information 125 is reproduced from the image imaged by the imaging unit (camera) of the reproduction device 150 illustrated in FIG. 1 is illustrated. The example illustrated in FIG. 3 is an example associated with each embodiment to be described.

The reproduction device 150 images the image of the object 130 based on the received light including the reflected light 140 by reflecting the irradiation light 120 from the object 130 and reproduces the specific information 125 by carrying out correction or the like to be described with respect to the color-difference signal generated from the received light.

In a case where the color-difference signal is generated from the received light, the image of each time acquired by the imaging unit is set as sampling data, the color-difference signal is reproduced based on a physical quantity such as intensity of the received light based on each sampling data. That is, the accuracy of the color-difference signal to be reproducing depends on a frame rate in a case where the imaging unit images the object 130 as a video.

For example, in a case where the frame rate of the imaging unit is 30 frames per second, the specific information 125 is superimposed on the illuminating light 115 at a data rate at which information can be reproduced even when sampling is performed at the frame rate. The invention is not limited thereto. However, the data rate in this case, for example, one cycle of the signal indicating the specific information 125 is 100 milliseconds to 1 second.

As described with reference to FIG. 2, in a case where the specific information 125 is superimposed on the illuminating light 115 by setting the luminance component in the YUV color space at a steady level and modulating the color-difference component, it is difficult for human eyes to see the variation even if the color-difference signal is modulated at a relatively low rate.

That is, when it is assumed that the specific information 125 which is superimposed on the illuminating light 115 is reproduced by the device with the relatively low frame rate, in order to satisfy both of an illuminating device and the illuminating device 110 which is used as a distribution source for distributing the information, it is preferable that the color-difference component in the YUV color space is modulated rather than directly modulating the color component of the RGB color space.

However, the invention is not limited to the example in which the color-difference component in the YUV color space is modulated. The specific information 125 is superimposed on the illuminating light 115 by modulating at a higher frequency than the frequency at which the human eyes feel flickering when directly modulating the color component of the RGB color space, and an imaging unit which capable of sampling even in a case of the frequency may be included in the reproduction device 150.

Figure 4:
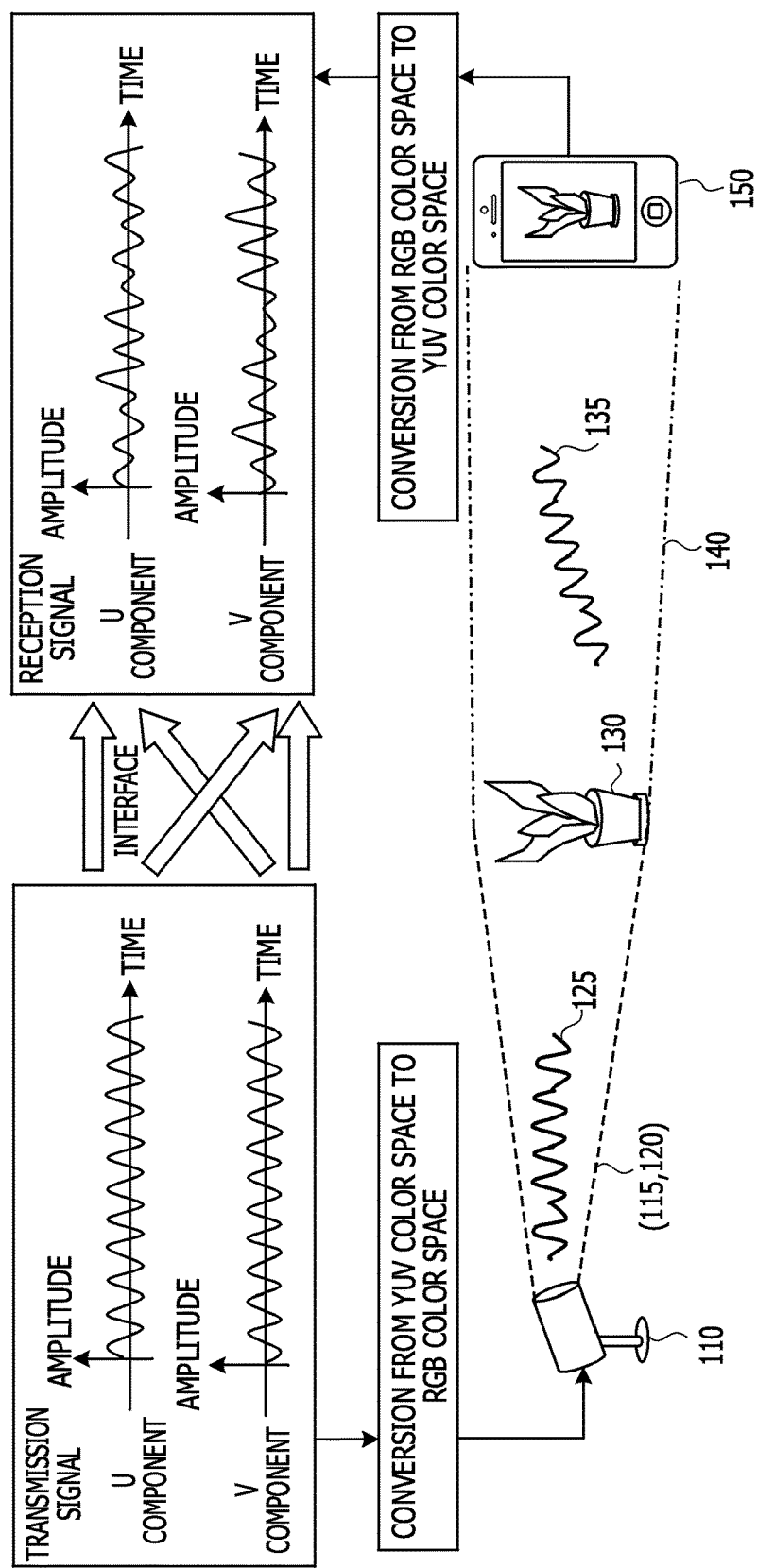
FIG. 4 illustrates an example of color space conversion.

FIG. 4 illustrates an example of color space conversion. A problem caused in a case where the color space is converted by the spectral reflectivity of the object will be described with reference to FIG. 4.

Firstly, Conversion Equations (1) to (3) from the YUV color space to the RGB color space are disclosed below. The illuminating device 110 converts the color-difference signal modulated based on the specific information 125 according to Conversion Equations (1) to (3) and causes the light emitting element to emit light according to a RGB signals obtained by conversion.

$$R = 1.000Y + 1.402V \quad (1)$$

$$G = 1.000Y - 0.344U - 0.714V \quad (2)$$

$$B = 1.000Y + 1.772U \quad (3)$$

Next, Conversion Equations (4) to (6) from the RGB color space to the YUV color space is disclosed below. The reproduction device 150 converts RGB signals included in the received light according to Conversion Equations (4) to (6) and the illuminating device 110 attempts to reproduce the specific information 125 which is superimposed on the light by the YUV signals obtained by conversion.

$$Y = 0.299R + 0.587G + 0.114B \quad (4)$$

$$U = 0.169R - 0.331G + 0.500B \quad (5)$$

$$V = 0.500R - 0.419G - 0.081B \quad (6)$$

For example, in a case where the gradation of the range which can be provided by each component is gradation from 0 to 255, a value of each term of Conversion Equations (1) to (6) I is a value in a case where the measured physical quantity it normalized to the gradation.

If only illuminating light 115 emitted from the illuminating device 110 is directly received by the reproduction device 150, by only extracting the YUV signals from the received light using the equations of Conversion Equations (4) to (6), the specific information 125 which is superimposed on the illuminating light 115 can be reproduced.

However, in a case where the reflected light 140 is included in the received light received by the reproduction device 150 by reflecting the irradiation light 120 from the specific object 130, the reproducing precision of the YUV signals obtained by the equations of Conversion Equations (4) to (6) may decrease depending on the spectral reflectivity of the object 130.

In FIG. 4, in order to superimpose the specific information 125 on the illuminating light 115 to be emitted by the illuminating device 110, the color-difference signals of the U component and the Y component which are generated by modulating the U component and the V component in the YUV color space based on the specific information 125 is exemplified as the transmission signal. The color-difference signal and the luminance signal of the U component and the Y component are RGB converted, and the light including RGB signals based on the conversion is radiated to the object 130 from the illuminating device 110.

A specific wavelength is absorbed by the spectral reflectivity of the object 130 in the RGB signals included in the irradiation light 120 radiated to the object 130. The light including the RGB signals in which the specific wavelength component is decreased due to the absorption become the reflected light 140. The light including the reflected light 140 is received by the reproduction device 150 as the received light.

That is, by the absorption of the specific wavelength component according to the spectral reflectivity of the object 130, the RGB signals of the reflected light 140 reaching the reproduction device 150 become R'G'B' signals difference from the RGB signals of the illuminating light 115 emitted by the illuminating device 110.

The reproduction device 150 uses Conversion Equations (4) to (6) above for reproducing the specific information 125 from the received light and calculates the YUV signals based on the R'G'B signals of the reflected light 140. That is, since the specific wavelength component is lost due to the absorption according to the spectral reflectivity of the object 130, the YUV components generated by the reproduction device 150 becomes the Y'U'V' signals different from the YUV signals generated by the illuminating device 110.

Such a phenomenon found by the inventors, in other words, in a case where the information is superimposed on the light on the assumption color space conversion is carried out in the visible light communication, symmetry of the color space conversion is broken by the absorption of the light due to the spectral reflectivity of the object and it can be considered that the broken of the symmetry is the result of that the color-difference signal in the transmission signal is interfered through Conversion Equations (1) to (6) with respect to the other color-difference signal in the reception signal.

In this application, it is called interference that the symmetry of the color space conversion is not maintained due to the influence of the spectral reflectivity of the object and a first component in the transmission signal affects a second component in the reception signal. The inventors have newly found that the information may not be satisfactorily reproduced without the interference in the visible light communication.

According to an example to be descried, even if the light is reflected from the object having the specific spectral reflectivity until the light on which the information is superimposed is reached the reproduction device, by correcting the color-difference signal in the received light based on the linear combination of the plurality of color-difference signal of the known amplitudes, the information superimposed on the light is satisfactorily reproduced.

Figure 5:
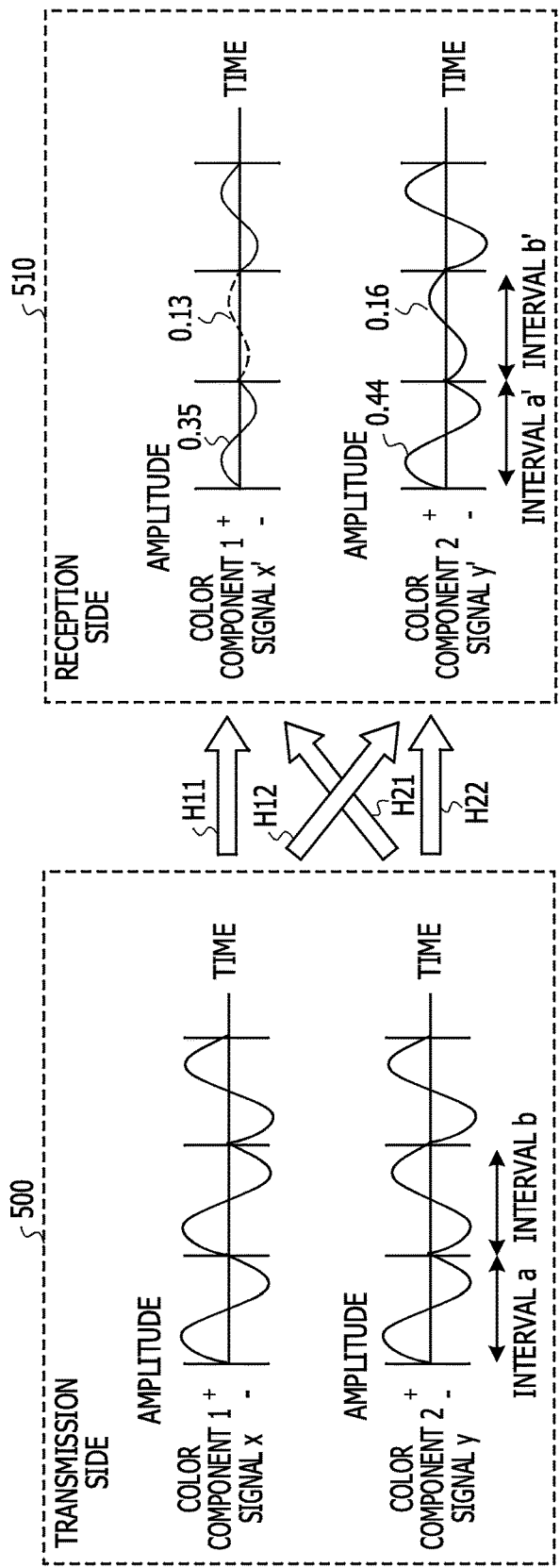
FIG. 5 illustrates a first embodiment.

FIG. 5 illustrates a first embodiment. An outline of the first embodiment will be described with reference to FIG. 5. A transmission side 500 and a reception side 510 are illustrated in FIG. 5. The transmission side 500 is, for example, the illuminating device 110. The reception side 510 is, for example, the reproduction device 150.

The specific information is superimposed on the light emitted to the transmission side 500 by modulating a signal x of a color component 1 and a signal y of a color component 2 in the transmission side 500 based on the specific information.

The color component 1 is, for example, the U component in the YUV color space. The signal x of the color component 1 is the color-difference signal of the U component. In addition, the color component 2 is, for example, the V component in the YUV color space and the signal y of the color component 2 is the color-difference signal of the V component. A component of the color space representing the color with the color component of the HLS color space, the luminance and the color component may be applied to the color component 1 and the color component 2.

In the example illustrated in FIG. 5, the phase modulation will be described as an example of the modulation method. However, the invention is not limited thereto. Various modulation methods exemplified in FIG. 2 can be applied.

In addition, the example illustrated in FIG. 5, a case where an amplitude ratio of the signal x and the signal y is 1:1 will be described. However, the invention is not limited thereto. However, 1:n (n is an integer) of the amplitude ratio of the signal x and the signal y can be generalized by considering the extent of contribution of the amplitude ratio of 1:n with respect to the corresponding component in an interference matrix to be described. In addition, the signal on which the information is superimposed may be any one of the signal x and the signal y.

As illustrated in FIG. 5, in an interval a, the phase of the signal x and the phase of the signal y are the same. For example, a symbol "0" for indicating the information is allocated to the phase of the interval a. On the other hand, in the interval b, the phase of the signal x and the phase of the signal y are opposite in phase. For example, the symbol "1" for indicating the information is allocated to the phase of the signal y in the interval b.

On the other hand, the color component 1 in the reception side 510 is, for example, the U component in the YUV color space. A signal x' of the color component 1 is the color-difference signal of the U component. In addition, the color component 2 is, for example, the V component in the YUV color space and a signal y' of the color component 2 is the color-difference signal of the V component.

As illustrated with reference to FIG. 4, for example, since the signal x and the signal y in the YUV color space are converted into the RGB signals and emitted as the light, and the RGB signals are reflected from the object having the specific spectral reflectivity, the signal x' and the signal y' become R'G'B' signals having a configuration of the color component different from the RGB signals based on the Y'U'V' signals having a configuration different from the original YUV signals which is acquired by converting the R'G'B signals received in the reception side.

The preamble portion may be embedded in the signal x and the signal y by the transmission side 500 by applying the example described in the second embodiment to be described, and when detecting the signal x' and the signal y', a subsequent data unit may be detected by detecting the preamble portion embedded in the signal.

It is to be noted that, the phase of the signal x' of the color component 1 of the interval b' in the reception side 510 is inverted as compared with the phase of the signal x of the color component 1 of the interval b in the transmission side 500. When the light is reflected from the object having the specific spectral reflectivity, as a result of absorption of the specific wavelength component, interference of the signal y of the color component 2 is affected when applying Conversion Equations (4) to (6) above. It is understood that unless information is reproduced from the signal x' in consideration of the interference, desired information is not reproduced.

In the first embodiment, even when the absorption of the specific wavelength occurs in a light propagation path, in consideration of the influence of the above interference by expressing the color-difference signal in the received light as the linear combination of the plurality of color-difference signals of the known amplitudes, the information is satisfactorily reproduced by correcting the color-difference signal in the received light according to the coefficient in the linear combination. Details will be described.

The amplitude ratio of the signal x and the signal y in the transmission side 500 is set to 1:1.

On the other hand, the amplitude (peak value in the interval a') of the signal x' received in the reception side 510 in the interval a' is 0.35. In addition, the amplitude (peak value in the interval b') of the signal x' received in the reception side 510 in the interval b' is 0.13. In this manner, since the phase of the signal x' may be reversed by the absorption of the light in the object, firstly, it is focused on the amplitude.

In addition, the amplitude (peak value in the interval a') of the signal y' received in the reception side 510 in the interval a' is 0.44. In addition, the amplitude (peak value in the interval b') of the signal y' received in the reception side 510 in the interval b' is 0.16. Similarly, since the phase of the signal y' may be reversed by the absorption of the light in the object, firstly, it is focused on the amplitude.

Firstly, the signal x' will be examined. In the same reason as descried with reference to FIG. 4, the signal x' has a contribution from the signal x and a contribution from the signal y. Here, the contribution from the signal x is represented by $H_{11}$ and the contribution from the signal y is represented by $H_{12}$.

Next, since both the signal x and the signal y have properties of the wave, superposition of $H_{11}$ and $H_{12}$ can be considered. If the signal x and the signal y are in the same phase, since the signal x and the signal y are in a mutually strengthening relationship, $H_{11}$ and $H_{12}$ are summed. On the other hand, if the signal x and the signal y are in an inverse phase, since the signal x and the signal y are in a mutually cancelling relationship, $H_{12}$ is subtracted from $H_{11}$.

In a case where the amplitude 0.35 of the signal x' in the interval a' is compared with the amplitude 0.13 of the signal x' in the interval b', the amplitude of the interval a' is greater than the amplitude of the interval b'. Since the information is represented in the transmission side 500 by two phases, when considering the combination of these phases, the signal x' in the interval a' is a signal obtained by mutually strengthening the signal x and the signal y, and it can be considered that the signal x' in the interval b' is a signal obtained by mutually strengthening the signal x and the signal y.

That is, since the amplitude ratio of the signal x and the signal y is set to 1:1, the signal x' in the interval a' is a signal which is obtained by summing $H_{11}$ and $H_{12}$, and the signal x' in the interval b' can be represented that it is $H_{11}$ and $H_{12}$ is a signal due to the difference. When it is expressed, Equation (7) is established. Since the amplitude (peak value) is used, a difference between $H_{11}$ and $H_{12}$ is set as an absolute value.

$$H_{11}+H_{12}:|H_{11}-H_{12}|=0.35:0.13 \qquad (7)$$

Next, the signal y' will be examined. Similarly to the signal x', the signal y' has the contribution from the signal x and the contribution from the signal y. Here, the contribution from the signal x is represented by $H_{21}$, and the contribution from the signal y is represented by $H_{22}$.

Since both the signal x and the signal y have properties of the wave, the superposition of $H_{21}$ and $H_{22}$ can be considered. If the signal x and the signal y are in the same phase, since the signal x and the signal y are in a mutually strengthening relationship, $H_{21}$ and $H_{22}$ are summed. On the other hand, if the signal x and the signal y are in an inverse phase, since the signal x and the signal y are in a mutually cancelling relationship, $H_{22}$ is subtracted from $H_{21}$.

In a case where the amplitude 0.44 of the signal y' in the interval a' is compared with the amplitude 0.16 of the signal y' in the interval b', the amplitude of the interval a' is greater than the amplitude of the interval b'. Since the information is represented in the transmission side 500 by two phases, when considering the combination of these phases, the signal y' in the interval a' is a signal obtained by mutually strengthening the signal x and the signal y, and it can be considered that the signal y' in the interval b' is a signal obtained by mutually strengthening the signal x and the signal y.

That is, since the amplitude ratio of the signal x and the signal y is set to 1:1, the signal y' in the interval a' is a signal which is obtained by summing $H_{21}$ and $H_{22}$, and the signal y' in the interval b' can be represented that it is $H_{21}$ and $H_{22}$ is a signal due to the difference. When it is expressed, Equation (8) is established. Since the amplitude (peak value) is used, a difference between $H_{21}$ and $H_{22}$ is set as an absolute value.

$$H_{21}+H_{22}:|H_{21}-H_{22}|=0.44:0.16 \tag{8}$$

When solving Equation (7), two solutions of a combination of $H_{11}=0.24$ and $H_{12}=0.11$ and a combination of $H_{11}=0.11$ and $H_{12}=0.24$ are obtained.

When solving Equation (8), two solutions of a combination of $H_{21}=0.14$ and $H_{22}=0.30$ and a combination of $H_{21}=0.30$ and $H_{22}=0.14$ are obtained.

Here, even when the light is reflected from the object having the specific spectral reflectivity until the light on which the information in the transmission side 500 is superimposed is reached the reception side 510, as described above, when assuming interference between the color components, the signal x' and the signal y' can be expressed as the linear combination of the signal x and the signal y in Equation (9). In the application, the matrix having $H_{11}$, $H_{12}$, $H_{21}$, and $H_{22}$ as components is referred to as an interference matrix.

$$\begin{bmatrix} H_{11} & H_{12} \\ H_{21} & H_{22} \end{bmatrix} \begin{bmatrix} x \\ y \end{bmatrix} = \begin{bmatrix} x' \\ y' \end{bmatrix} \tag{9}$$

It is assumed of $H_{11}=0.24$ and $H_{12}=0.11$, and $H_{21}=0.14$ and $H_{22}=0.30$. Equation (10) is obtained by constituting these conditions into the interference matrix of Equation (9), obtaining an inverse matrix thereof, and representing the signal x and the signal y as the linear combinations of the signal x' and the signal y'.

$$\frac{1}{0.057} \begin{bmatrix} 0.30 & -0.11 \\ -0.14 & 0.24 \end{bmatrix} \begin{bmatrix} x' \\ y' \end{bmatrix} = \begin{bmatrix} x \\ y \end{bmatrix} \tag{10}$$

From Equation (10), each of the amplitudes of the signal x' and the signal y' which are acquired in the reception side 510 can be estimated.

The amplitude of 0.35 of the signal x' in the interval a' of the reception side 510 and the amplitude of 0.44 of the signal y' are substituted into x' and y' in Equation (10). In this case, both the amplitude of the signal x and the amplitude of the signal y in the interval a in the transmission side are 1, which matches the setting of the phase modulation with the assumed amplitude ratio of 1:1.

On the other hand, the amplitude of 0.13 of the signal x' in the interval b' of the reception side 510 and the amplitude of 0.16 of the signal y' are substituted into x' and y' in Equation (10). In this case, the amplitude of the signal x in the interval b on the transmission side is 0.37. In addition, the amplitude of the signal y in the interval b in the transmission side is 0.35. That is, it is against the setting of the phase modulation with the assumed amplitude ratio of 1:1. In this manner, a combination of values of $H_{11}$, $H_{12}$, $H_{21}$, and $H_{22}$ obtained by solving Equations (7) and (8) is checked based on whether the assumed amplitude ratio matches the setting of the phase modulation of 1:1.

As a result of this checking, for the case illustrated in FIG. 5, in the case of Equations (11) and (12) as the interference matrix, the interference matrix matching the setting of the phase modulation with the assumed amplitude ratio of 1:1.

$$\begin{bmatrix} 0.11 & 0.24 \\ 0.14 & 0.30 \end{bmatrix} \tag{11}$$

$$\begin{bmatrix} 0.24 & 0.11 \\ 0.30 & 0.14 \end{bmatrix} \tag{12}$$

Next, decoding of the signal x' and the signal y' is carried out in two cases of Equation (11) and Equation (12). In the determination of whether the decoding is succeeded, error detection based on an error correction code or the like added to the specific information to be transmitted in the transmission signal is performed. According to the result of the error detection results, either Equation (11) or Equation (12) is selected.

In addition, in this example, there is a case where the contribution from the signal y in the signal x' is in the phase of the signal y, and the contribution from the signal x in the signal y' is in the phase of the signal x, as described in the description of the third embodiment, it can be considered that the contribution from the signal y in the signal x' may be opposite in phase to the signal y, or the contribution from the signal x in the signal y' may be opposite to the signal x. That is, there is a case where $H_{12}$ and $H_{21}$ may be negative coefficients. In this case, the pattern of the interference matrix may be estimated by solving Equation (7)' and Equation (8)' below which replaces magnitude relationships in Equation (7) and Equation (8) and a combination of Equation (7) and Equation (8).

$$|H_{11}+H_{12}|:H_{11}-H_{12}=0.13:0.35 \tag{7'}$$

$$|H_{21}+H_{22}|:H_{21}-H_{22}=0.16:0.44 \tag{8'}$$

For each of the amplitudes of the sampling points in the signal x' and the signal y', the sampling points corresponding to the signal x and the signal y is obtained using the inverse matrix of the selected interference matrix. In this manner, for example, even when the phase of the signal x' in the interval b' is inverted from the desired phase, the signal x and the signal y can be satisfactorily reproduced, and the specific information which is superimposed on the signal x and the signal y can be reproduced.

The light may be emitted by modulating the amplitudes of the signal x and the signal y based on the selected interference matrix such that the specific information is superimposed on the light by phase-modulation in the transmission side 500 and the signal x' and the signal y' received in the reception side 510 become a desired phase.

As described above, in a case where the information is superimposed on the light on the assumption that the color space conversion is carried out in the visible light communication, even when the symmetry of the color space conversion is broken by the absorption of the light due to the spectral reflectivity of the object, the information superimposed on the light can be satisfactorily reproduced by correcting the signal (for example, the color-difference signal) in the received light based on the linear combination of the plurality of signals (for example, the color-difference signal in the transmission side) of the known amplitudes.

Figure 6:
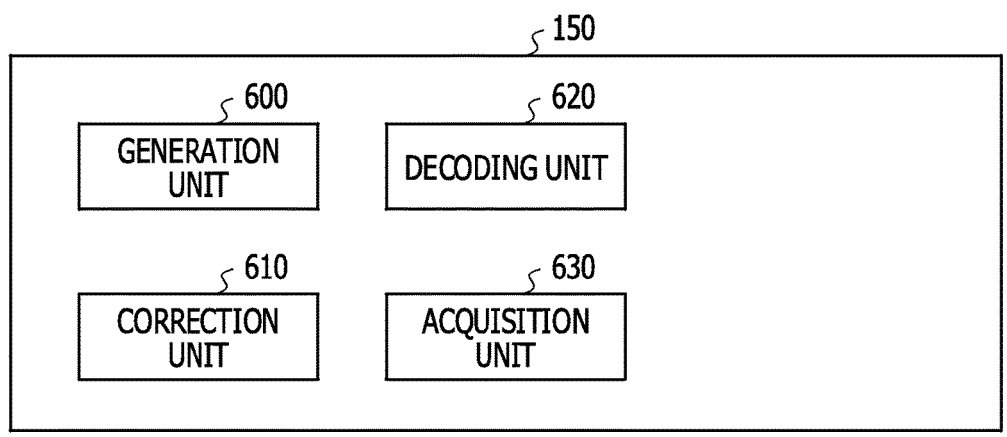
FIG. 6 illustrates a functional block of the first embodiment.

FIG. 6 illustrates a functional block of the first embodiment. As illustrated in FIG. 6, the reproduction device 150 illustrated in FIG. 1 serves as a generation unit 600, a correction unit 610, a decoding unit 620, and an acquisition unit 630 by executing a program loaded on RAM of the reproduction device 150 by the CPU of the reproduction device 150 to be used as a working memory. The functional units are functional blocks for obtaining the first embodiment described with reference to FIG. 5. Processes to be executed by these functional units will be described with reference to FIG. 7, and a hardware configuration obtaining these functional units will be described with reference to FIG. 21.

Figure 7:
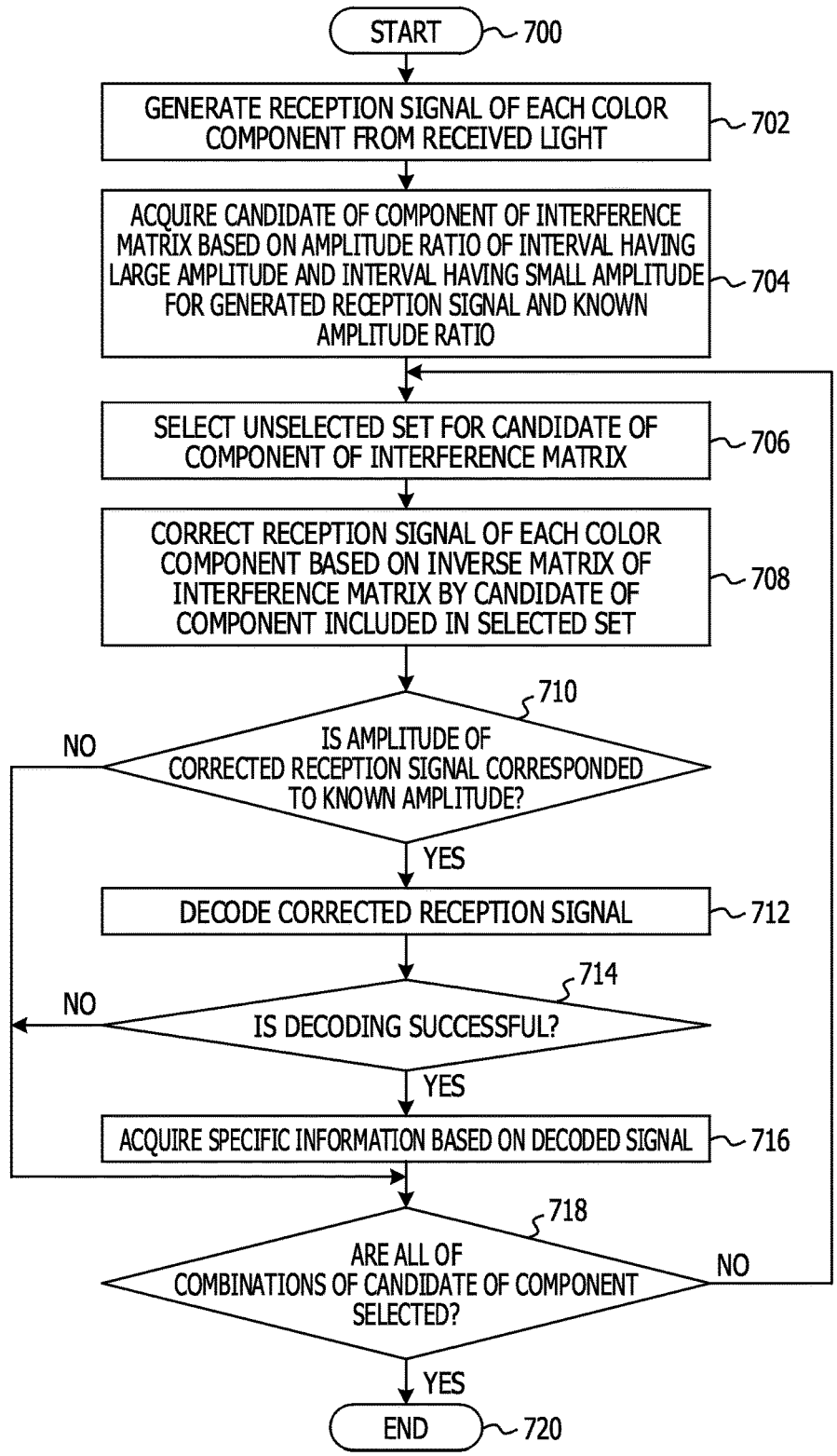
FIG. 7 illustrates a process in the first embodiment.

FIG. 7 illustrates a process in the first embodiment. A process illustrated in FIG. 7 is a process to be executed by the reproduction device 150 illustrated in FIG. 1, and a process for obtaining the first embodiment illustrated in FIG. 5 and for satisfactorily reproducing the specific information from the received light by the reproduction device 150. The process illustrated in FIG. 7 is started by a process 700.

Next to the process 700, a process 702 for generating the reception signal of each color component from the received light is executed by the generation unit 600. In the process 702, the reproduction device 150 samples the intensity of each of the RGB components of the received light in time series, and the sampled intensity is normalized to the gradation from 0 to 255, for example. By substituting the normalized values of each of the RGB components into Conversion Equations (4) to (6) above, the illuminating device 110 generates a signal, on which the information is superimposed, for example, the color-difference signals of the U component and the V component in the YUV component as the reception signal.

The process 704 of acquiring candidates of the components of the interference matrix is executed by the correction unit 610 based on the amplitude ratios of the interval having a large amplitude for the generated reception signal and the interval having a small amplitude. In the process 704, as illustrated in FIG. 5, the candidates of the components of the interference matrix are acquired.

In the process 704, for example, for the color-difference signal of the U component generated in the process 702, a peak value of the one modulation cycle is set as the amplitude based on the value at the sampling point calculated in the process 702. Next, the peak value for the other modulation cycle is acquired, the amplitude ratio of the interval having a large amplitude and the interval having a small amplitude by comparing each of the peak values for each modulation cycle.

Similarly, for the color-difference signal of the V component generated by the process 702, the amplitude ratio of the interval having large amplitude and the interval having a small interval is determined.

For the color-difference signal of the U component and the color-difference signal of the V component, a relational equation corresponding to Equation (7) and Equation (8) described above is established according to each of the determined amplitude ratios and the acquired each peak value, and by solving the relational equation, one or more combination candidate of a combination from the candidates of values of $H_{11}$, $H_{12}$, $H_{21}$, and $H_{22}$ that are components of the interference matrix is acquired.

For the candidates of the components of the interference matrix, a process 706 for selecting an unselected set is executed by the correction unit 610. In the process 706, a combination which is not selected among the one or more combination candidates of the combination formed of the candidates of the values of $H_{11}$, $H_{12}$, $H_{21}$, and $H_{22}$ which are obtained in the process 704 is selected.

The process 708 for correcting the reception signal of each color component is executed by the correction unit 610 based on the inverse matrix of the interference matrix by the candidates of the components included in the selected set. In the process 708, the inverse matrix of the interference matrix formed of the candidates of the values of $H_{11}$, $H_{12}$, $H_{21}$, and $H_{22}$ selected in the process 706 is calculated. In order to estimate the color-difference signal when the information is superimposed in the transmission side, each of the color-difference signals of the U component and the V component in the received light is corrected based on the inverse matrix.

More specifically, as Equation (10) described above with reference to FIG. 5, each of the color-difference signals of the U component and the V component in the transmission side is represented as the linear combination in each of the color-difference signals of the U component and the V component in the received light based on the inverse matrix. The correction is performed by carrying out the inverse matrix to the color-difference signals of the U component and the V components in the received light, and each of the color-difference signals of the U component and the V component in the transmission side is estimated.

Next to the process 708, a process 710 for determining whether the amplitude of the corrected reception signal corresponds to the known amplitude is executed by the correction unit 610. In the process 710, it is determined whether the amplitude of the corrected reception signal by the process 708 corresponds to the known amplitude ratio referred in the process 704.

Hereinafter, a meaning of the process 710 will be described. If the candidates of the values of $H_{11}$, $H_{12}$, $H_{21}$, and $H_{22}$ selected in the process 706 are reasonable and the color-difference signals of the U component and the V component in the received light are satisfactorily corrected, the color-difference signals of the U component and the V component on the transmission side may be reproduced by the correction. Furthermore, considering that the color-difference signals of the U component and the V component on the transmission side are modulated according to the known amplitude ratio, it is determined whether the amplitude of the corrected reception signal matches the known amplitude. Accordingly, it can be considered that it can be confirmed whether the candidates of the values of $H_{11}$, $H_{12}$, $H_{21}$, and $H_{22}$ selected in the process 706 are valid. In the process 704, the candidates of the values of $H_{11}$, $H_{12}$, $H_{21}$, and $H_{22}$ selected in the process 706 are determined to be valid.

In a case where it is not determined that the amplitude of the corrected reception signal in the process 710 corresponds to the known amplitude, the process 718 that determines whether all of the combinations of the candidates of the components are selected already is executed by the correction unit 610. In a case where it is determined that all of the combinations of the candidates of the components are not selected, the process proceeds to the process 706, and in a case where it is determined that all of the combinations of the candidates of the components are selected already, the process proceeds to the process 720 to terminate the process illustrated in FIG. 7.

In a case where it is determined that the amplitude of the reception signal corrected in the process 710 corresponds to the known amplitude, the process 712 that decodes the corrected reception signal is executed by the decoding unit 620. In the process 712, in order to acquire the specific information, the color-difference signal corrected by the process 708 is decoded according to the modulation method when information is superimposed on the light.

Next to the process 712, the process 714 for determining whether the decoding is succeeded is executed by the decoding unit 620. In the process 714, for the color-difference signal decoded by the process 712, error detection is performed based on an error correction code or the like embedded in a specific position of the signal, and determines whether the decoding is succeeded according to a result of the error detection.

In a case where it is not determined that the decoding is succeeded in the process 714, the process proceeds to the process 718.

In a case where it is determined that the decoding is succeeded in the process 714, the process 716 for acquiring the specific information based on the decoded signal is executed by the acquisition unit 630. The successful decoding in the process 714 can be considered that the candidates of the components of the interference matrix selected in the process 706 are a valid component. Therefore, the information which is acquired by decoding the color-difference signal corrected by the interference matrix by the selection is acquired as the specific information which is superimposed on the light in the transmission side.

Next to the process 716, in a case where the acquired specific information is information for specifying the other information to be desired to acquire in the reproduction device 150 as illustrated in FIG. 1, for example, the specific information is an ID for specifying the other information, or is information for specifying the URL for acquiring the other information, a process in which the ID or the URL corresponding to the specific information 125 is designated and accesses to the server device 170 in which the other information is held, and the other information is acquired as a response from the server device 170 corresponding to the access may be executed by the acquisition unit 630. Furthermore, charging in a case where the other information is acquired from the server device 170 may be issued.

In a case where the received light is continuously received and a process for reproducing the specific information from the received light is continued using the specific interference matrix, the processes 702 to 718 are repeated, and in a case where the process illustrated in FIG. 7 it to be ended, the process proceeds to the process 720 to end the process.

According to the first embodiment described above, the color-difference signal in the received light is represented as the linear combination of the plurality of color-difference signals of the known amplitudes, and the color-difference signals in the received light is corrected based on the components of the interference matrix when representing the linear combination. Therefore, the information which is superimposed on the light in the transmission side can be satisfactorily reproduced.

Figure 8:
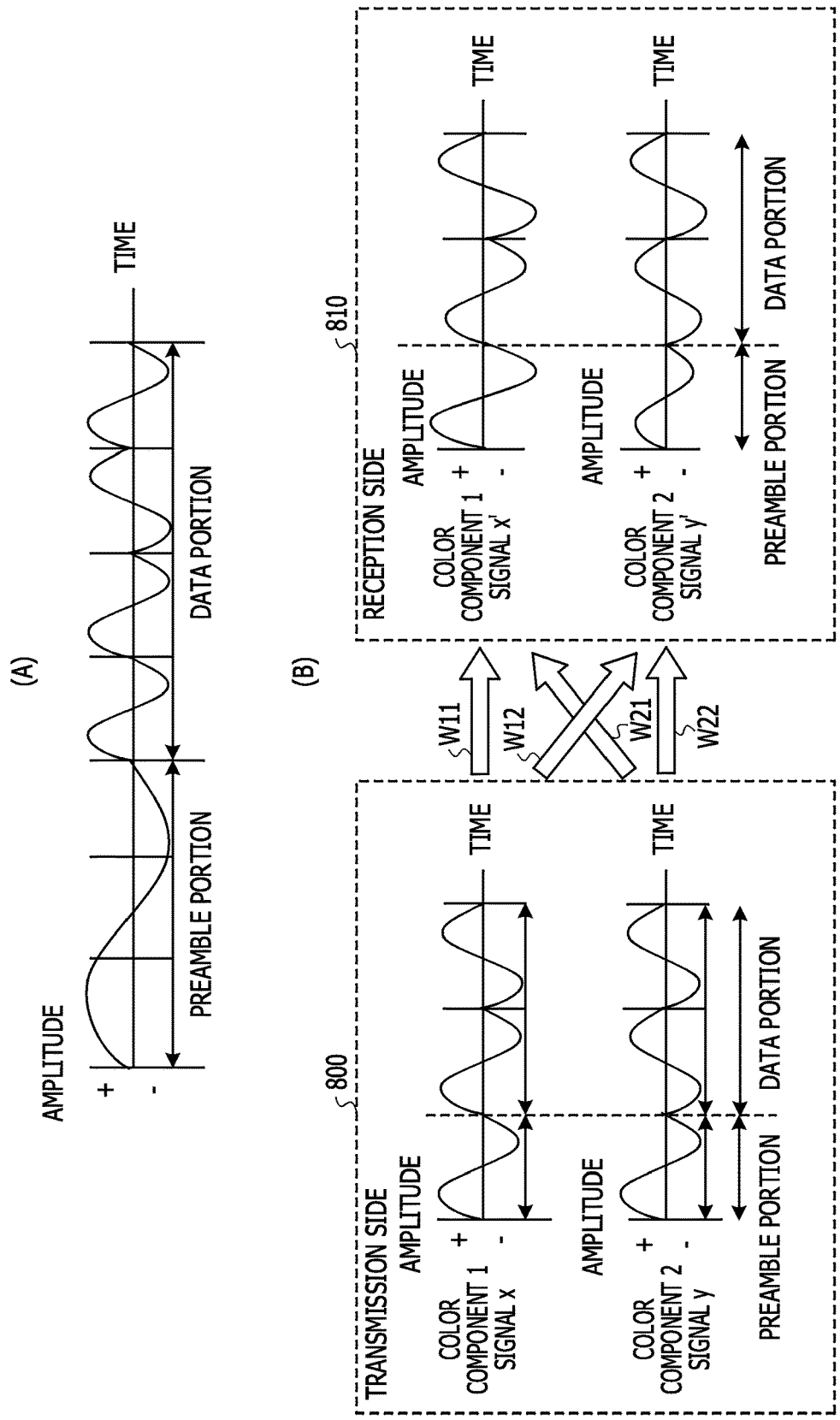
FIG. 8 illustrates a second embodiment.

FIG. 8 illustrates a second embodiment. An outline of the second embodiment will be described with reference to FIG. 8. In (A) of FIG. 8, an example of the preamble embedded in the signal is illustrated. The invention is not limited thereto. The preamble as exemplified in here may be embedded in the signal in the other embodiments. In (B) of FIG. 8, a transmission side 800 and a reception side 810 are illustrated. The transmission side 800 is, for example, the illuminating device 110. The reception side 810 is, for example, the reproduction device 150.

As illustrated in (A) of FIG. 8 in addition to the specific information to be superimposed on the light, a specific pattern to be recognized as the preamble is superimposed on the signal of a certain color component. The specific pattern is the known pattern, and a pattern having a time characteristic different from the time characteristic of the modulation when the specific information is superimposed.

In this manner, the transmission signal from the transmission side 800 and the reception signal in the reception side 810 include at least the preamble portion based on the specific pattern and the data portion based on the specific information. Since the specific pattern is the known pattern, it can be considered that a predetermined reference signal is inserted in the transmission signal and the reception signal.

In the reception side 810, after the color-difference signal is generated from the received light, a mutual correlation function between the signal in each interval and the specific pattern is calculated while sliding the signal interval that is an operand of the color-difference signal in a time direction. As a result of the calculation, a signal interval in which the mutual correlation function between the signal and the specific pattern becomes a maximum value is specified as the preamble portion.

If each of the reference signal to be embedded in the color-difference signal of the U component and the V component in the YUV color space is set to be in an orthogonal relationship, in the calculation of the mutual correlation function between the color-difference signal generated from the received light and the specific pattern, the interference between the U component and the V component does not occur.

In addition, in a case where the same reference signals $S(t)$ are embedded in the color-difference signal of the U component and the V component in the YUV color space, since either of a preamble portion $Su(t)$ of the reception signal of the U component and a preamble portion $Sv(t)$ of the reception signal of the V component becomes a linear conversion signal of the reference signal $S(t)$, for example, the peak of the mutual correlation function between $S(t)$ and $-S(t)$ can be easily detected, even when the positive and the negative of the signal of the preamble portion is inverted due to the interference of the U component and the V component.

In (B) of FIG. 8, the specific information is superimposed on the light emitted to the transmission side 800 by the modulating the signal x of the color component 1 and the signal y of the color component 2 in the transmission side 800 based on the specific information. In the signal x and the signal y, the preamble portion having the specific pattern for recognizing as the preamble of the signal in addition to the data portion on which the specific information is superimposed is provided prior to the data portion.

The color component 1 is, for example, the U component in the YUV color space. The signal x of the color component 1 is the color-difference signal of the U component. In addition, the color component 2 is, for example, the V component in the YUV color space and the signal y of the color component 2 is the color-difference signal of the V component. A component of the color space representing the color with the color component of the HLS color space, the luminance and the color component may be applied to the color component 1 and the color component 2.

In the example illustrated in FIG. 8, the phase modulation will be described as an example of the modulation method. However, the invention is not limited thereto. Various modulation methods exemplified in FIG. 2 can be applied.

In addition, in the example illustrated in FIG. 8, a case where an amplitude ratio of the signal x and the signal y is 1:1 will be described. However, the invention is not limited thereto. However, 1:n (n is an integer) of the amplitude ratio of the signal x and the signal y may be used. In addition, the signal on which the information is superimposed may be any one of the signal x and the signal y.

On the other hand, the color component 1 in the reception side 810 is, for example, the U component in the YUV color space. The signal x' of the color component 1 is the color-difference signal of the U component. In addition, the color component 2 is, for example, the V component in the YUV color space and a signal y' of the color component 2 is the color-difference signal of the V component. The signal x' and the signal y' have the preamble portion and the data portion as illustrated in FIG. 8.

As illustrated with reference to FIG. 4, for example, since the signal x and the signal y in the YUV color space are converted into the RGB signals and emitted as the light, and the RGB signals are reflected from the object having the specific spectral reflectivity, the signal x' and the signal y' become R'G'B' signals having a configuration of the color component different from the RGB signals based on the Y'U'V' signals having a configuration different from the original YUV signals which is acquired by converting the R'G'B signals received in the reception side.

In the second embodiment, a weighting matrix W represented in Equation (13) is estimated, and as represented in Equation (14), each of the signal x and the signal y can be represented as the linear combination of the signal x' and the signal y' through the weighting matrix W. The signal x' and the signal y' are corrected using the inverse matrix of the weighting matrix W.

$$W = \begin{bmatrix} w_{11} & w_{12} \\ w_{21} & w_{22} \end{bmatrix} \quad (13)$$

$$\begin{bmatrix} x \\ y \end{bmatrix} = \begin{bmatrix} w_{11} & w_{12} \\ w_{21} & w_{22} \end{bmatrix} \begin{bmatrix} x' \\ y' \end{bmatrix} \quad (14)$$

In the estimation of the weighting matrix W, for example, each color component in the YUV color space may be regarded as a plurality of channels in a multiple-input and multiple-output (MIMO) communication and may use a minimum mean square error algorithm (MMSE), for example. In addition, as a method for correcting the reception signal based on the preamble portion, various types of methods such as a basic local alignment search tool (BLAST) method, a maximum likelihood detection (MLD) method, a sphere decoding (SD) method, a complexity-reduced maximum likelihood detection with QR decomposition and M-algorithm (QRM-MLD) method, or the like may be applied. By applying these algorithms, it is possible to estimate and suppress the influence of interference between color components and other noise with high accuracy. As a result, it is possible to suppress the degradation of the reception signal with high accuracy.

Figure 9:
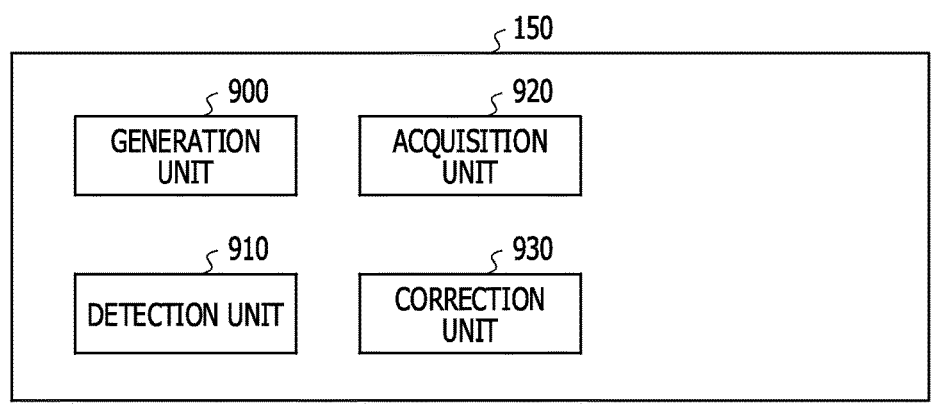
FIG. 9 illustrates a functional block of the second embodiment.

FIG. 9 illustrates a functional block of the second embodiment. As illustrated in FIG. 9, the reproduction device 150 illustrated in FIG. 1 serves as a generation unit 900, a detection unit 910, an acquisition unit 920, and a correction unit 930 by executing a program loaded on RAM of the reproduction device 150 by the CPU of the reproduction device 150 to be used as a working memory. The functional units are functional blocks for obtaining the second embodiment described with reference to FIG. 8. Processes to be executed by these functional units will be described with reference to FIG. 10, and a hardware configuration obtaining these functional units will be described with reference to FIG. 21.

Figure 10:
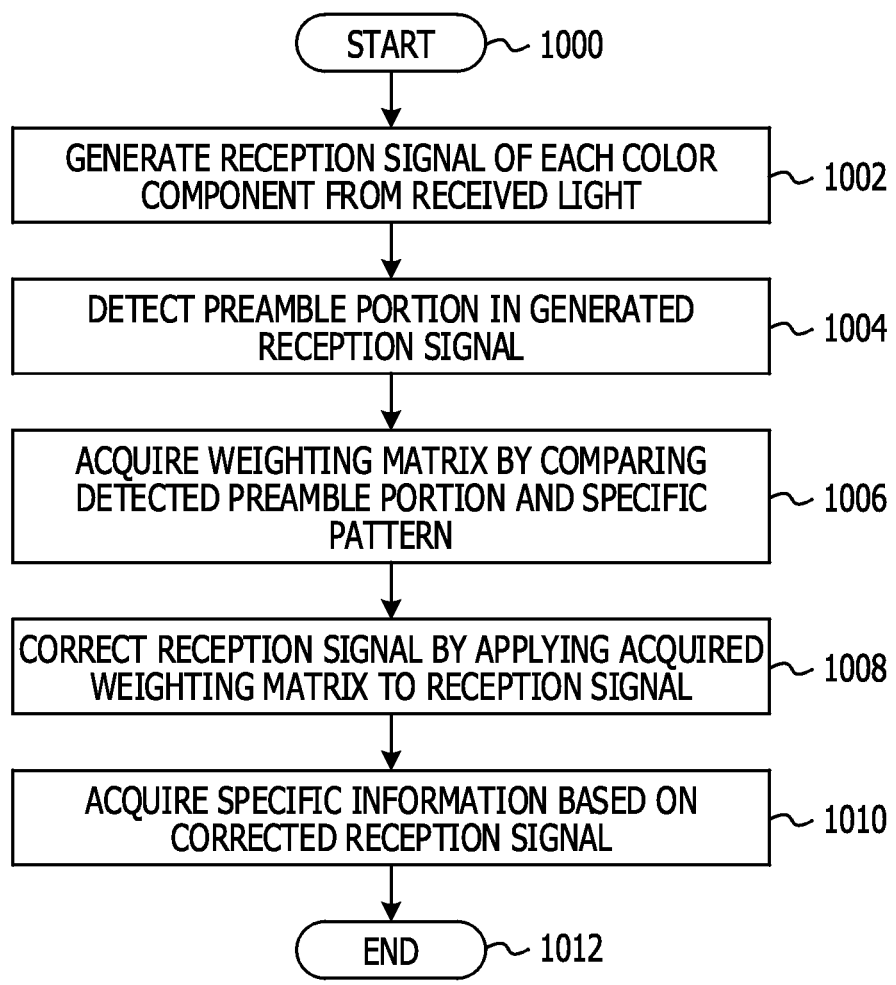
FIG. 10 illustrates a process of the second embodiment.

FIG. 10 illustrates a process of the second embodiment. A process illustrated in FIG. 10 is a process to be executed by the reproduction device 150 illustrated in FIG. 1, and a process for obtaining the second embodiment illustrated in FIG. 8 and for satisfactorily reproducing the specific information from the received light by the reproduction device 150. The process illustrated in FIG. 10 is started by a process 1000.

Next to the process 1000, a process 1002 for generating the reception signal of each color component from the received light is executed by the generation unit 900. In the process 1002, the reproduction device 150 samples the intensity of each of the RGB components of the received light in time series, and the sampled intensity is normalized to the gradation from 0 to 255, for example. By substituting the normalized values of each of the RGB components into Conversion Equations (4) to (6) above, the illuminating device 110 generates a signal, on which the information is superimposed, for example, the color-difference signals of the U component and the V component in the YUV component as the reception signal.

A process 1004 for detecting the preamble portion in the generated reception signal is executed by the detection unit 910. In the process 1004, the mutual correlation function between the signal in each interval and the specific pattern corresponding to the preamble is calculated while sliding the color-difference signals of the U component and the V component generated by the process 1002 in the time direction. As a result of the calculation, a signal interval in which the mutual correlation function between the signal and the specific pattern becomes a maximum value is detected as the preamble portion.

A process 1006 for acquiring a weighting matrix by comparing the detected preamble portion and the specific pattern is executed by the acquisition unit 920. In the process 1006, for example, by regarding each preamble portion of the color-difference signals of the U component and the V component detected by the process 1004 as a plurality of channels in the MIMO communication, for example, by using the MMSE algorithm, and estimating the weighting matrix W represented in Equation (13) above, the weighting matrix W is acquired.

A process 1008 for correcting the reception signal by applying the acquired weighting matrix to the reception signal is executed by the correction unit 930. In the process 1008, the color-difference signals of the U component and the V component in the reception side 810 is corrected by calculating Equation (14) above using the weighting matrix W acquired by the process 1006. By the process 1008, the color-difference signals of the U component and the V component when it is transmitted by the transmission side 800 are reproduced.

A process 1010 for acquiring the specific information based on the corrected reception signal is executed by the acquisition unit 920. In the process 1010, the specific information which is superimposed on the light is acquired by the transmission side 800 based on the color-difference signals of the U component and the V component corrected in the process 1008.

Next to the process 1010, in a case where the acquired specific information is information for specifying the other information to be desired to acquire in the reproduction device 150 as illustrated in FIG. 1, for example, the specific information is an ID for specifying the other information, or is information for specifying the URL for acquiring the other information, a process in which the ID or the URL corresponding to the specific information 125 is designated and accesses to the server device 170 in which the other information is held, and the other information is acquired as a response from the server device 170 corresponding to the access may be executed by the acquisition unit 920. Furthermore, charging in a case where the other information is acquired from the server device 170 may be issued.

A process illustrated in FIG. 10 is ended by the process 1012.

According to the above-described second embodiment, even when the symmetry of the color space conversion is not maintained due to the influence of the spectral reflectivity of the object and the first component in the transmission signal is interference to the second component in the reception signal, the pattern of the preamble is determined in advance, and the specific information which is superimposed on the light can be satisfactorily reproduced by using the weighting matrix which is acquired by regarding each color component in the reception signal as the plurality of channels of the MIMO communication.

Figure 11:
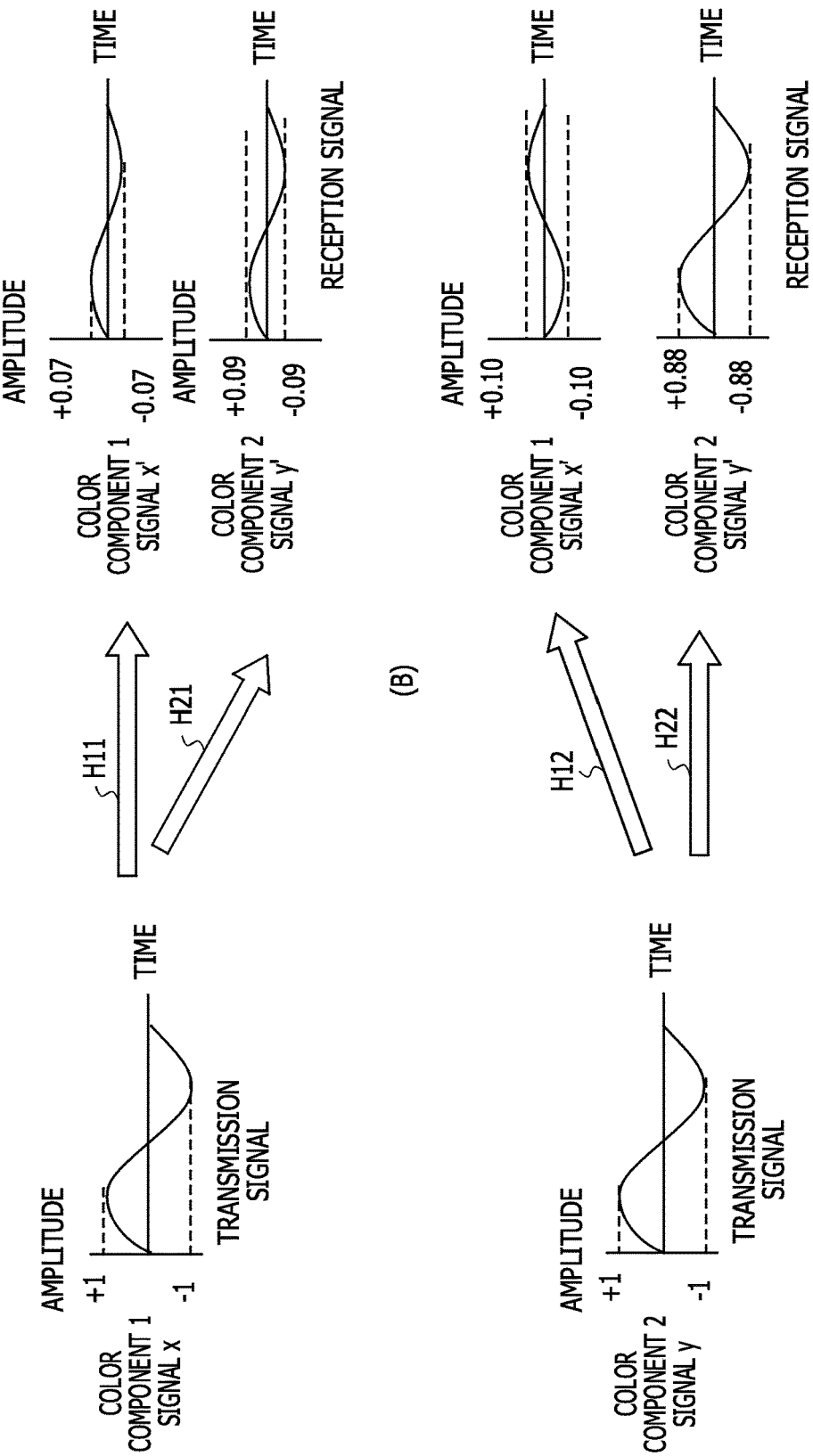
FIG. 11 illustrates a third embodiment.

FIG. 11 illustrates a third embodiment. An outline of the third embodiment will be described with reference to FIG. 11. The third embodiment is an embodiment in which the reproduction device 150 can satisfactorily produce the specific information from the received light by estimating the spectral reflectivity of the object to which the light emitted from the illuminating device 110 is radiated and using the interference matrix corresponding to the estimated spectral reflectivity.

Although described in below, the interference matrix corresponding to the estimated spectral reflectivity may be selected from the plurality of interference matrixes corresponding to various types of spectral reflectivities which are prepared assuming that various types of objects are irradiated with the light emitted from the illuminating device 110 as the interference matrix used in the third embodiment. In this case, if there is no interference matrix associated with the spectral reflectivity matching the estimated spectral reflectivity, an interference matrix associated with the spectral reflectivity most similar to the estimated spectral reflectivity may be selected. In addition, when the spectral reflectivity of the object is estimated, an interference matrix may be calculated based on the spectral reflectivity without preparing the interference matrix.

Firstly, in the third embodiment, an example in which the signal x of the color component 1 that is the transmission signal and the signal y of the color component 2 that the reception signals are sinusoidal waves having the amplitude ratio of 1:1, the color component 1 is the U component in the YUV color space, and the color component 2 is V component in the YUV color space is described. However, similarly to the above-described embodiments, it will be described that the present invention is not limited to the examples.

The signal x' of the color component 1 is, for example, the color-difference signal of the U component in the YUV color space and the signal y' of the color component 2 is, for example, the color-difference signal of the V component in the YUV color space.

As illustrated with reference to FIG. 4, for example, since the signal x and the signal y in the YUV color space are converted into the RGB signals and emitted as the light, and the RGB signals are reflected from the object having the specific spectral reflectivity, the signal x' and the signal y' become R'G'B' signals having a configuration of the color component different from the RGB signals based on the Y'U'V' signals having a configuration different from the original YUV signals which is acquired by converting the R'G'B signals received in the reception side.

The preamble portion may be embedded in the signal x and the signal y by the transmission side by applying the example described in the second embodiment to be described, and when detecting the signal x' and the signal y', a subsequent data unit may be detected by detecting the preamble portion embedded in the signal.

(A) of FIG. 11 illustrates that as a result of that the light including the signal x of the U component having the amplitude of 1 as the transmission signal is reflected from the object, the influence of the spectral reflectivity of the object is affected, a part of the reflected light contributes to the signal x' of the U component that is a reception signal as $H_{11}$ and the other part of the reflected light contributes to the signal y' of the V component that is the reception signal as $H_{12}$.

The spectral reflectivity of the object can be handled as a resultant which is obtained by multiplying the conversion coefficient which is obtained when the RGB signals configuring the reflected light of the object is converted into the YUV signals in the reception side by specific reflectivity coefficients α, β, and γ (0≤α≤1, 0≤β≤1, and 0≤γ≤1). The resultants are represented in Equations (15) to (17). In Equations (15) to (17), αR which is obtained by multiplying R by a is the above-described R', βG which is obtained by multiplying G by β is the above-described G', and γB which is obtained by multiplying B by γ is the above-described B'.

$$Y'=\alpha \times 0.299R+\beta \times 0.587G+\gamma \times 0.114B \quad (15)$$

$$U'=\alpha \times (-0.169)R+\beta \times (-0.331)G+\gamma \times 0.500B \quad (16)$$

$$V'=\alpha \times 0.500R+\beta \times (-0.419)G+\gamma \times (-0.081)B \quad (17)$$

Here, as the spectral reflectivity of the object, for example, when it is set that α=1.0, β=0.6, and γ=0.0, since the Y component that is the luminance signal is assumed to be maintain steady, and each amplitude of the signal x and the signal y is assumed as 1, the $H_{11}$ component contributing from the signal x to the signal x' by calculating using Equations (1) to (3) and Equations (15) to (17) becomes 0.07. Similarly, $H_{12}$ component contributing from the signal y to signal y' becomes 0.09.

On the other hand, (B) of FIG. 11 illustrates that as a result of that the light including the signal y of the V component having the amplitude of 1 as the transmission signal is reflected from the object, the influence of the spectral reflectivity of the object is affected, a part of the reflected light contributes to the signal x' of the U component that is a reception signal as $H_{21}$ and the other part of the reflected light contributes to the signal y' of the V component that is the reception signal as $H_{22}$.

Here, in similar to a case of (A) of FIG. 11, as the spectral reflectivity of the object, for example, when it is set that $\alpha=1.0$, $\beta=0.6$, and $\gamma=0.0$, since the Y component that is the luminance signal is assumed to be maintain steady, and each amplitude of the signal x and the signal y is assumed as 1, the $H_{21}$ component contributing from the signal y to the signal x' by calculating using Equations (1) to (3) and Equations (15) to (17) becomes 0.10. Similarly, $H_{11}$ component contributing from the signal y to signal y' becomes 0.88.

The amplitude of the signal x' to be detected in the reception side is the sum of the $H_{11}$ component of the signal x' illustrated in (A) of FIG. 11 and the $H_{21}$ component of the signal x' illustrated in (B) of FIG. 11. On the other hand, the amplitude of the signal y' to be detected in the reception side is the sum of the $H_{12}$ component of the signal y' illustrated in (A) of FIG. 11 and the $H_{22}$ component of the signal y' illustrated in (B) of FIG. 11.

Here, it is noted that in a case where conditions of $\alpha=1.0$, $\beta=0.6$, and $\gamma=0.0$ are set based on the spectral reflectivity of the object, the phase of the signal x of the transmission side is revered in the reception side. In a case where the information is superimposed on the light using the phase information, if such the phase inversion occurs, the information may not be correctly reproduced.

In the third embodiment, for example, it is assumed that the light emitted from the illuminating device 110 is radiated to various types of objects, the interference matrix assuming various types of spectral reflectivities is prepared. If in an example of the above-described spectral reflectivity, the prepared interference matrix is represented by Equation (18) and the relationship between the signal x and the signal y and the signal x' and the signal y' is represented by Equation (19). In Equation (18), the reason why the code of $H_{21}$ is set to be minus is that the phase inversion is reflected as illustrated in (B) of FIG. 11.

$$H = \begin{bmatrix} 0.07 & 0.09 \\ -0.10 & 0.88 \end{bmatrix} \quad (18)$$

$$\begin{bmatrix} x \\ y \end{bmatrix} = \begin{bmatrix} 0.07 & 0.09 \\ -0.01 & 0.88 \end{bmatrix} \begin{bmatrix} x' \\ y' \end{bmatrix} \quad (19)$$

In the third embodiment, for each spectral reflectivity assumed, the interference matrix represented by Equation (18) or the inverse matrix thereof is obtained, and each of the interference matrixes or the inverse matrixes are associated with the spectral reflectivity set when obtaining the interference matrix or the inverse matrix and stored in a storage device in advance.

The spectral distribution of the light for superimposing the specific information is predetermined, and the reflectivity coefficients $\alpha$, $\beta$, and $\gamma$ are estimated from the spectral distribution of the predetermined light and the received light.

As described above, in the third embodiment, since the interference matrix and the inverse matrix thereof is associated with the corresponding reflectivity coefficient and prepared, the interference matrix or the inverse matrix thereof associated with the estimated reflectivity coefficient is selected. By correcting the signal x' and the signal y' generated from the received light based on the inverse matrix obtained from the selected interference matrix or the selected inverse matrix, the signal x and the signal y in the transmission side are estimated and the superimposed specific information is produced and acquired.

Although the amplitude ratio of the U component and the Y component of the transmission side is set to 1:1, in a case where the amplitude ratio of the U component and the V component is 1:n, the interference matrix may be set to Equation (20). The interference matrix according to Equation (20) or the inverse matrix thereof may be associated with the reflectivity coefficient and prepared.

$$H = \begin{bmatrix} H_{11} & n \times H_{12} \\ H_{21} & n \times H_{22} \end{bmatrix} \quad (20)$$

Figure 12:
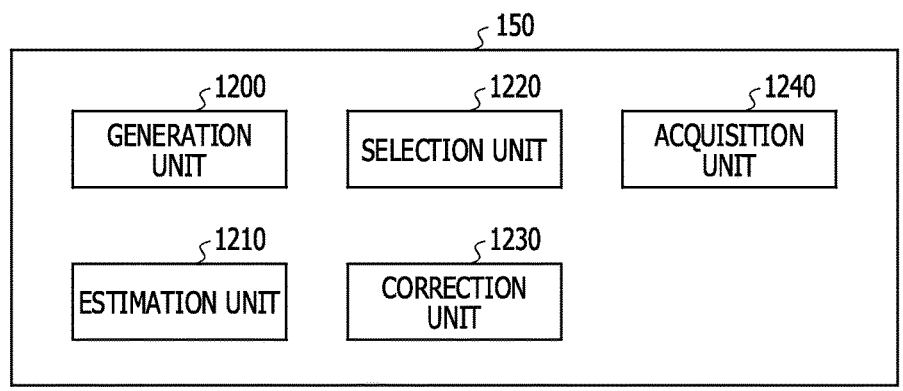
FIG. 12 illustrates a functional block of the third embodiment.

FIG. 12 illustrates a functional block of the third embodiment. As illustrated in FIG. 12, the reproduction device 150 illustrated in FIG. 1 serves as a generation unit 1200, an estimation unit 1210, a selection unit 1220, a correction unit 1230, and an acquisition unit 1240 by executing a program loaded on RAM of the reproduction device 150 by the CPU of the reproduction device 150 to be used as a working memory. The functional units are functional blocks for obtaining the third embodiment described with reference to FIG. 11. Processes to be executed by these functional units will be described with reference to FIGS. 13 and 14, and a hardware configuration obtaining these functional units will be described with reference to FIG. 21.

Figure 13:
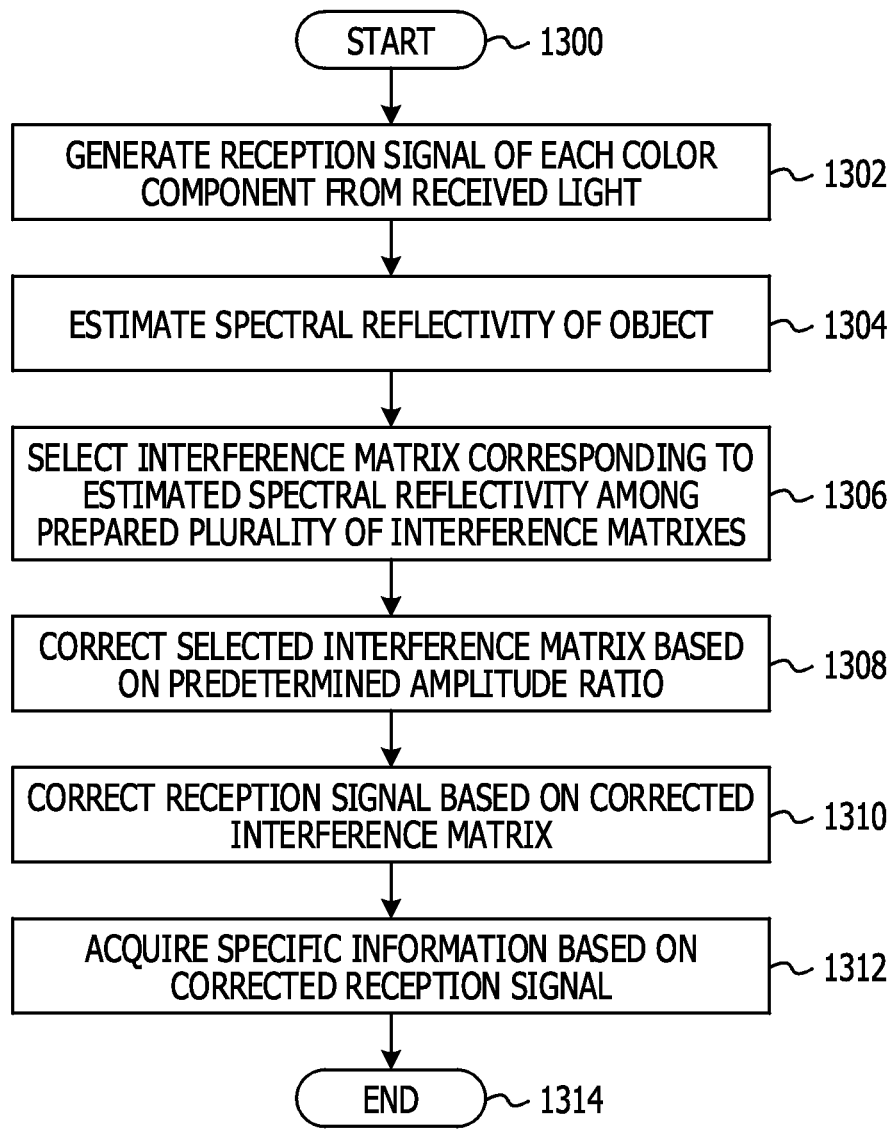
FIG. 13 illustrates a process of the third embodiment.

FIG. 13 illustrates a process of the third embodiment. A process illustrated in FIG. 13 is a process to be executed by the reproduction device 150 illustrated in FIG. 1, and a process for obtaining the third embodiment illustrated in FIG. 11 and for satisfactorily reproducing the specific information from the received light by the reproduction device 150. The process illustrated in FIG. 13 is started by a process 1300.

A process 1302 for generating the reception signal of each color component from the received light is executed by the generation unit 1200. In the process 1302, the reproduction device 150 samples the intensity of each of the RGB components of the received light in time series, and the sampled intensity is normalized to the gradation from 0 to 255, for example. By substituting the normalized values of each of the RGB components into Conversion Equations (4) to (6) above, the illuminating device 110 generates a signal, on which the information is superimposed, for example, the color-difference signals of the U component and the V component in the YUV component as the reception signal.

A process 1304 for estimating the spectral reflectivity of the object is executed by the estimation unit 1210. In the process 1304, as illustrated in FIG. 11, the spectral reflectivity of the object is estimated by obtaining the reflectivity coefficients $\alpha$, $\beta$, and $\gamma$ in Conversion Equations (15) to (17) from the known spectral distribution (for example, transmitted light in which the spectral distribution is predetermined, white light, or the like) and the received light.

For example, in a case where the light to be radiated to the object or the light being radiated to the object is white, for each component in the RGB color space indicating the spectral distribution of the light, the value which is normalized in the gradation of 0 to 255 becomes RGB=(255, 255, 255). In a case where the light is reflected by the object, and the reflected light is received, the reflectivity coefficients can be obtained by comparing the normalized value of each component of the RGB color space in the received light and the spectral distribution of the light.

For example, in a case where the value of each component in the RGB color space of the received light becomes (100, 150, 60), the reflectivity coefficients become $\alpha$=0.39 (=100/255), $\beta$=0.59 (=150/255), and $\gamma$=0.26 (=60/255).

The spectral distribution of the light can be determined using a spectrometry device, for example. However, for the consideration of an error between the characteristic of the spectrometry device and the characteristic of the light receiving element receiving the received light, for example, the correction of the error may be performed by measuring the value of each component in the RGB color space in a case where the light being radiated to the object is directly received by the light receiving element. If the influence of the variations in the characteristic of the light receiving element is small, and if the deviation between the assumed spectral measurement and the spectral distribution is negligible, the variations may be regarded as matching.

A process 1306 for selecting the interference matrix corresponding to the estimated spectral reflectivity among the prepared plurality of interference matrixes is executed by the selection unit 1220.

In the process 1306, the prepared plurality of interference matrixes are a plurality of interference matrixes or the inverse matrixes thereof obtained by assuming the various types of spectral reflectivities according to the method described with reference to FIG. 11, and are associated with the corresponding spectral reflectivity (reflectivity coefficient) and stored in the storage device in advance. In the process 1306, the interference matrix corresponding to the spectral reflectivity (reflectivity coefficient) estimated by the process 1304 is selected from the prepared plurality of interference matrix.

In addition, in the process 1306, if the interference matrix corresponding to the spectral reflectivity (reflectivity coefficient) estimated by the process 1304 is not found, the interference matrix associated with the spectral reflectivity most similar to the estimated spectral reflectivity may be selected and the specific information may be reproduced by applying the first embodiment.

Here, in order to exemplify how to obtain the most similar spectral reflectivity, an example of an evaluation method of the degree of similarity will be described below.

For example, a value normalized such that a becomes 1 in the reflectivity coefficients ($\alpha$, $\beta$, $\gamma$) estimated by the process 1304 is defined as ($\alpha'$, $\beta'$, $\gamma'$), and a value normalized such that $\gamma$ becomes 1 in the value (r, g, b) of each component in the RGB color space in the spectral reflectivity of the light to be radiated to the object or the light being radiated to the object is defined as (r', g', b'). In this case, the degree of similarity $\mu$ is represented by Equation (21).

$$\mu=[\{(\alpha'-r')^2+(\beta'-g')^2\}+\{(\alpha'-r')^2+(\gamma'-b')^2\}+\{(\beta'-g')^2+(\gamma'-b')^2\}]^{-1} \quad (21)$$

In Equation (21), since the reciprocal of the distance between two spectral reflectivities to be compared is considered as the degree of similarity $\mu$, the spectral reflectivity is similar as $\mu$ becomes greater (that is, as the distance becomes smaller). The invention is not limited the method, and the other method for evaluating the degree of similarity $\mu$ of ($\alpha$, $\beta$, $\gamma$) and (r, g, b) may be used.

A process 1308 for correcting the selected interference matrix based on the predetermined amplitude ratio is executed by the correction unit 1230.

The prepared plurality of interference matrix to be used in the process illustrated in FIG. 13 is not assumed in Equation (20). The interference matrix obtained according to setting of the spectral reflectivity in a case where the amplitude ratio of the color-difference signal of the transmission side is 1:1 is assumed. Therefore, in a case where the specific information is actually reproduced from the received light, if the amplitude of the color-difference signal in the transmitted light is not set to 1:1, the component of the interference matrix selected by the process 1306 is corrected in combination with the amplitude ratio of the color-difference signal in the transmitted light.

In the process 1308, the component of the interference matrix selected by the process 1306 is corrected based on the amplitude ratio to be applied to the color-difference signal in the actual transmitted light and Equation (20).

A process 1310 for correcting the reception signal based on the corrected interference matrix is executed by the correction unit 1230. In the process 1310, the each color-difference signal in the received light is corrected based on the component of the interference matrix corrected by the process 1308. By the correction, each color-difference signal in the transmitted light can be estimated.

A process 1312 for acquiring the specific information based on the corrected reception signal is executed by the acquisition unit 1240. In the process 1312, the specific information which is superimposed on the transmitted light is reproduced and acquired by decoding each color-difference signal corrected by the process 1310.

Next to the process 1312, in a case where the acquired specific information is information for specifying the other information to be desired to acquire in the reproduction device 150 as illustrated in FIG. 1, for example, the specific information is an ID for specifying the other information, or is information for specifying the URL for acquiring the other information, a process in which the ID or the URL corresponding to the specific information 125 is designated and accesses to the server device 170 in which the other information is held, and the other information is acquired as a response from the server device 170 corresponding to the access may be executed by the acquisition unit 1240. Furthermore, charging in a case where the other information is acquired from the server device 170 may be issued.

By the process 1314, the process illustrated in FIG. 13 is ended.

Regarding the process illustrated in FIG. 13, a case where the plurality of interference matrixes is prepared is exemplified. The invention is not limited thereto.

In a case where the interference matrix is not prepared, or in a case where the plurality of interference matrixes are prepared, and the interference matrix corresponding to the spectral reflectivity (reflectivity coefficient) estimated by the process 1304 is not found, the interference matrix is calculated based on the spectral reflectivity when the spectral reflectivity of the object is estimated by the process 1304 according to the method illustrated in FIG. 11, and the reception signal may be corrected by the calculated interference matrix.

Figure 14:
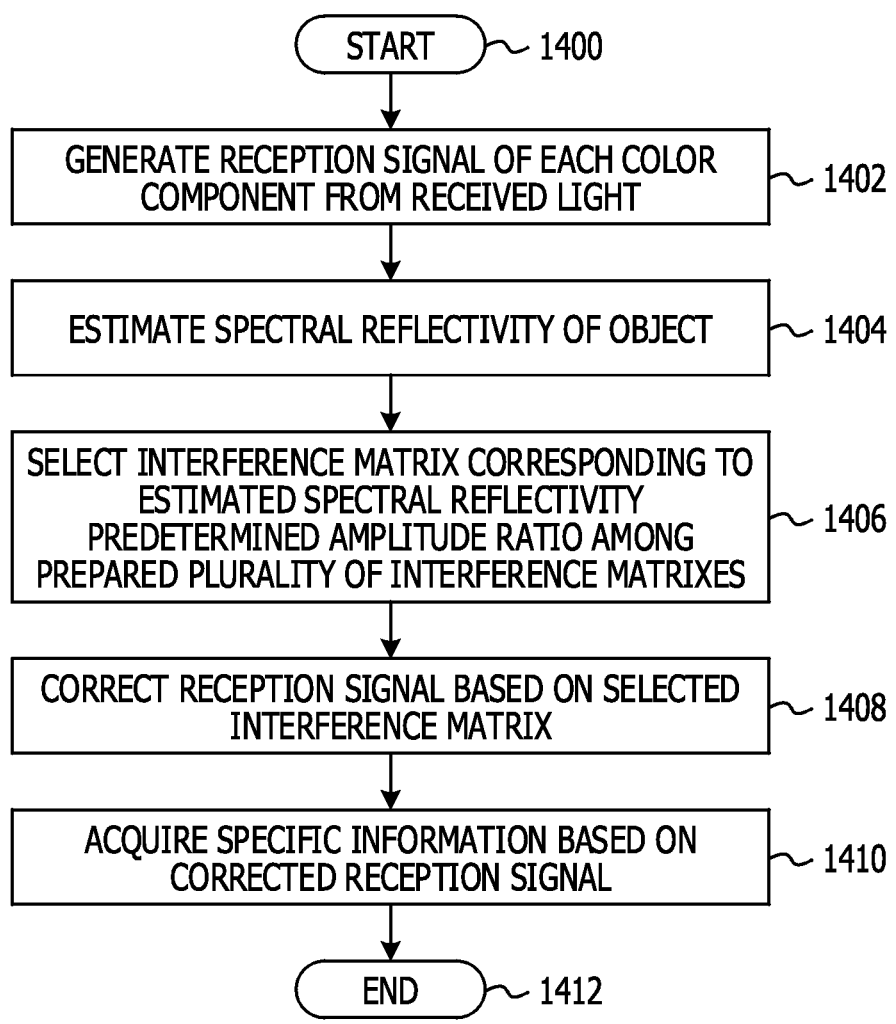
FIG. 14 illustrates the other example of the process of the third embodiment.

FIG. 14 illustrates the other example of the process of the third embodiment. The process illustrated in FIG. 14 is a process to be executed by the reproduction device 150 illustrated in FIG. 1, and the other process for satisfactorily reproducing the specific information from the received light received in the reproduction device 150 by implementing the third embodiment illustrated in FIG. 11.

The difference between the process illustrated in FIG. 14 and the process illustrated in FIG. 13 is as follow. In the process illustrated in FIG. 13, the interference matrix which is obtained according to the setting of each spectral reflectivity in a case where the amplitude ratio of the color-difference signals of the transmission side is 1:1 is assumed as the prepared plurality of interference matrixes. With respect to this, in the process illustrated in FIG. 14, the interference matrix which is obtained according to the setting of each spectral reflectivity for each candidate of n in a case where the amplitude ratio of the color-difference signals of the transmission side is 1:n is assumed.

That is, in the example illustrated in FIG. 13, since a process for correcting the component of the interference matrix based on the actual amplitude ratio by the process 1308, the interference matrix when the amplitude ratio of the color-difference signals of the transmission side is 1:1 may be prepare. With respect to this, in the example illustrated in FIG. 14, a large number of the interference matrixes which are prepared for n candidates in a case where the amplitude ratio of the color-difference signals of the transmission side is 1:n, and the process for correcting the interference matrix is omitted.

When a process is started by the process 1400, a process 1402 for generating the reception signal of each color component from the received light is executed by the generation unit 1200. The reproduction device 150 samples the intensity of each of the RGB components of the received light in time series, and the sampled intensity is normalized to the gradation from 0 to 255, for example. By substituting the normalized values of each of the RGB components into Conversion Equations (4) to (6) above, the illuminating device 110 generates a signal, on which the information is superimposed, for example, the color-difference signals of the U component and the V component in the YUV component as the reception signal.

A process 1404 for estimating the spectral reflectivity of the object is executed by the estimation unit 1210. In the process 1404, as illustrated in FIG. 11, the spectral reflectivity of the object is estimated by obtaining the reflectivity coefficients α, β, and γ in Conversion Equations (15) to (17) from the known spectral distribution (for example, transmitted light in which the spectral distribution is predetermined, white light, or the like) and the spectral distribution of the received light.

A process 1406 for selecting the interference matrix corresponding to the estimated spectral reflectivity and the predetermined amplitude ratio among the prepared plurality of interference matrixes is executed by the selection unit 1220. In the process 1406, the interference matrix corresponding to the spectral reflectivity (reflectivity coefficient) estimated by the process 1404 and the predetermined amplitude ratio of the transmission signals is selected from the prepared plurality of interference matrixes.

In the process 1404, if the corresponding interference matrix is not found, the specific information may be reproduced by applying the first embodiment.

A process 1408 for correcting the reception signal based on the corrected interference matrix is executed by the correction unit 1230. In the process 1408, the each color-difference signal in the received light is corrected based on the component of the interference matrix corrected by the process 1406. By the correction, each color-difference signal in the transmitted light can be estimated.

A process 1410 for acquiring the specific information based on the corrected reception signal is executed by the acquisition unit 1240. In the process 1410, the specific information which is superimposed on the transmitted light is reproduced and acquired by decoding each color-difference signal corrected by the process 1408.

By the process 1412, the process illustrated in FIG. 14 is ended.

According to the above-described third embodiment, by assuming that the light on which the specific information is superimposed is radiated to various types of objects, the specific information can be satisfactorily reproduced from the received light by preparing the interference matrix assuming the various types of spectral reflectivities.

Figure 15:
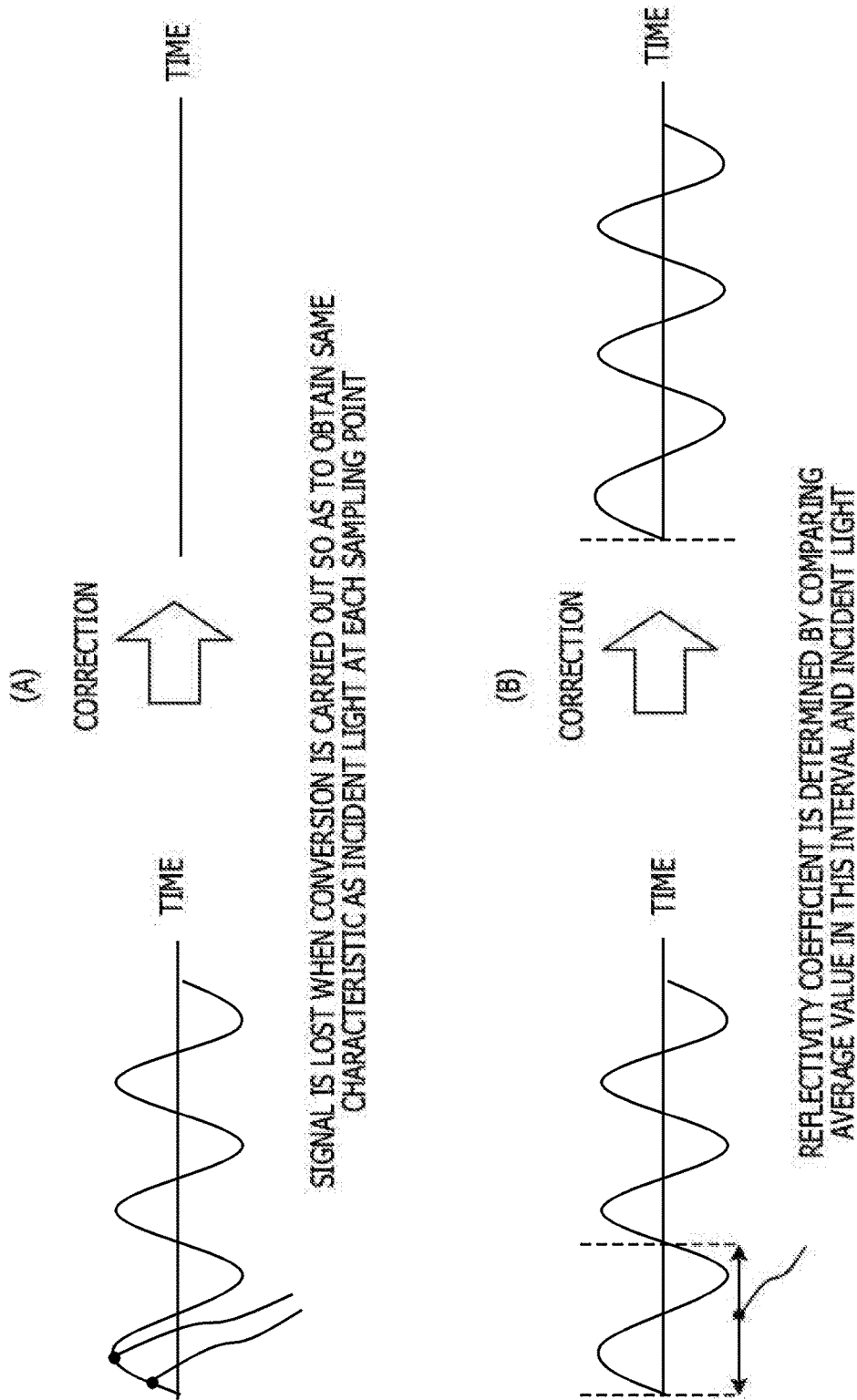
FIG. 15 illustrates a fourth embodiment.

FIG. 15 illustrates a fourth embodiment. An outline of the fourth embodiment will be described with reference to FIG. 15. The fourth embodiment is an embodiment for estimating the spectral reflectivity of the object from the received light including the reflected light from the object in a case where the object is irradiated with the light in the visible light communication.

In the fourth embodiment, by predetermining the spectral distribution of the transmitted light, estimating the reflectivity coefficients α, β, and γ in Equations (15) to (17) by comparing the received light and the transmitted light according to the predetermined spectral distribution, and applying the reciprocal of the reflectivity coefficient to the RGB values of the received light, interference due to asymmetry in the color space conversion is suppressed. For example, the estimation of the reflectivity coefficient may be performed in the same manner as the method described in the description of the third embodiment.

In a case where the RGB values of the received light are R'(=α×R), G'(=β×G), and B'(=γ×B), re-converting is carried out by multiplying the reciprocals of the estimated reflectivity coefficient to these values. The re-converted values are set as R", G", and B", respectively. Since the reception signals Y'U'V' converted in the YUV space are R"=R, G"=G, and B"=B, the following equations are obtained, and the transmission signal can be restored without influence of the interference in the reception side.

$$Y'=0.299R''+0.587G''+0.114B''=Y \quad (22)$$

$$U'=-0.169R''+(-0.331)G''+0.500B''=U \quad (23)$$

$$V'=0.500R''+(-0.419)G''+(-0.081)B''=V \quad (24)$$

By the characteristic of the light receiving element of the reception side, there is a case where the estimation error between α, β, and γ occurs.

In this case, strictly the conditions of R"=R, G"=G, and B"=B are not estimated. However, it may be regarded as the same as long as there is not influence in the restoration of the transmission signal. In addition, the correction may be performed by adding the specification of the light receiving element.

In addition, in the re-conversion, the inverse ratio of each coefficient may be applied instead of multiplying the reciprocals of α, β, and γ.

For example, in a case of α=0.125, β=0.25, and γ=0.50, the reciprocals of the coefficients are 1/α=8, 1/β=4, and 1/γ=2. On the other hand, the inverse ratio of α:β:γ is 4:2:1.

With respect to a case where Y'U'V' is generated using the conversions R"=R'×8, G"=G'×4, and B"=2×B' by the reciprocals, the Y'U'V' generated using the conversion R"=R'×4, G"=G'×2, and B"=1×B' by the inverse ratio become Y'=½Y, U'=½U, and V'=½V. That is, by generating the signal which is obtained by only linearly converting the transmission signal, it is possible to easily decode the information.

In addition, regarding the case where any one of the estimated reflectivity coefficients becomes 0, for example, it may be set to the maximum value that can be implemented instead of setting the reciprocal of the coefficient to infinity.

However, as illustrated in (A) of FIG. 15, since the intensity of the received light is varied with time, if using the reflectivity coefficients α, β, and γ which are obtained by comparing the value of the received light and the transmitted light having the known spectral distribution for each sampling point in a case where the received light is sampled, there is a possibility that the specific information which is superimposed on the transmitted light is lost when correcting the received light.

In the fourth embodiment, as illustrated in (B) of FIG. 15, the reflectivity coefficients α, β, and γ are determined in a comparison between the average value of the received lights corresponding to n (0<n) cycle and the transmitted light having the known spectral distribution. According to the fourth embodiment, if the watermark signal is embedded so as to maintain the spectral distribution steady when averaging is performed according to the signal cycle, it is possible to estimate the spectral distribution with high accuracy by performing averaging process with synchronization with the signal.

In addition, it is possible to prepare the interference matrix described in the third embodiment is prepared by estimating the spectral reflectivity (reflectivity coefficient) by the same method and using the estimated spectral reflectivity (reflectivity coefficient) or application such as immediately calculating the interference matrix can be possible. In addition, in the third embodiment, the reception signal is corrected using the interference matrix after generating the reception signal in the YUV space. However, the generated reception signal may be corrected using the reciprocal of the estimated reflectivity coefficient instead of using the interference matrix. As the actual process, $1/\alpha$, $1/\beta$, and $1/\gamma$ are multiplied to the term of R, the term of G, and the term of B in Equations (15) to (17), respectively, and finally, the same equations as the Equations (22) to (24) can be estimated.

For the estimation with high accuracy, the average value corresponding to n (0<n) cycle is used, and the invention is not limited thereto. For example, in (A) of FIG. 15, in a case where the spectral reflectivity and the correction value are estimated using a first sampling point at which the signal is received, and the received light is converted using the same correction value as the correction value estimated from the first sampling point at the later sampling point, the watermark signal is not lost.

Figure 16:
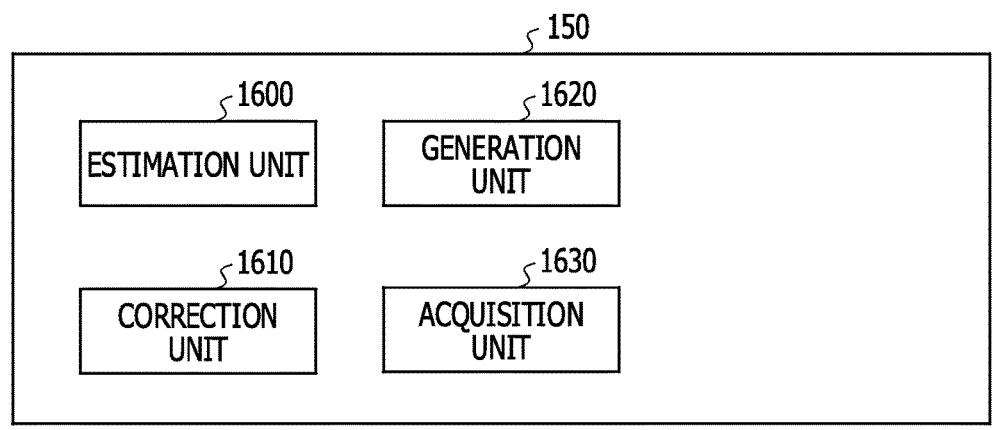
FIG. 16 illustrates a functional block of the fourth embodiment.

FIG. 16 illustrates a functional block of the fourth embodiment. As illustrated in FIG. 16, the reproduction device 150 illustrated in FIG. 1 serves as an estimation unit 1600, a correction unit 1610, a generation unit 1620, and an acquisition unit 1630 by executing a program loaded on RAM of the reproduction device 150 by the CPU of the reproduction device 150 to be used as a working memory. The functional units are functional blocks for obtaining the fourth embodiment described with reference to FIG. 15. Processes to be executed by these functional units will be described with reference to FIG. 17, and a hardware configuration obtaining these functional units will be described with reference to FIG. 21.

Figure 17:
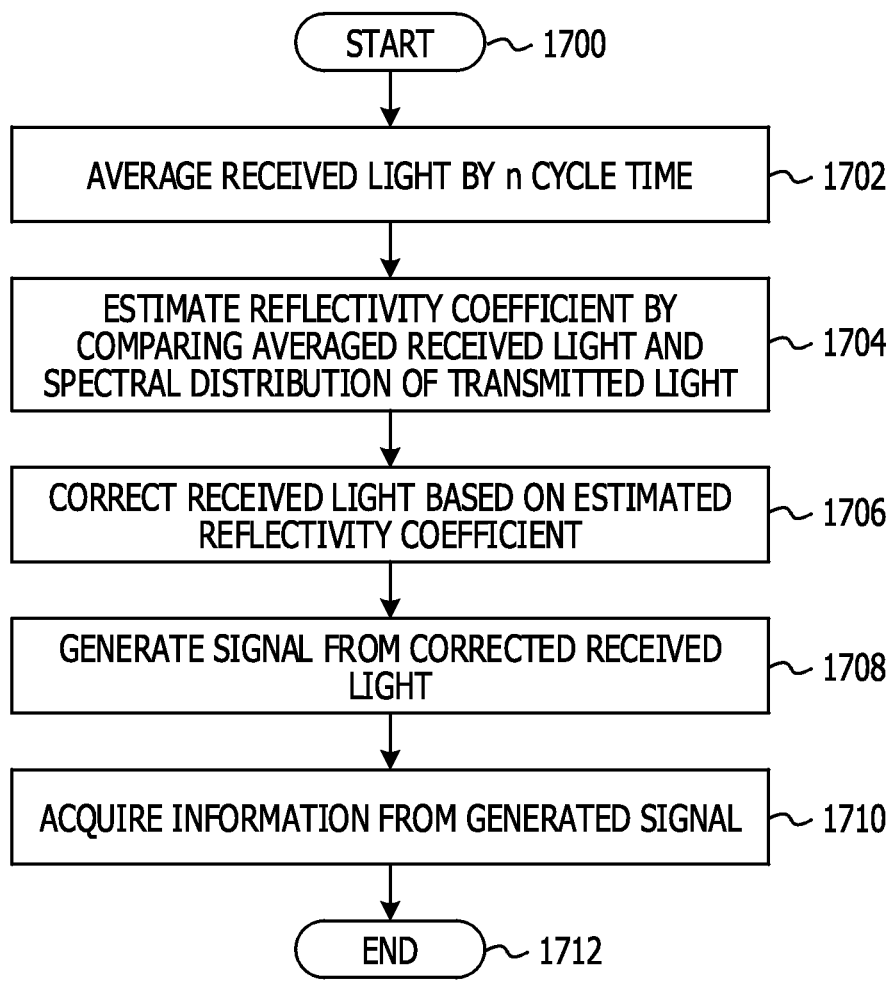
FIG. 17 illustrates a process of the fourth embodiment.

FIG. 17 illustrates a process of the fourth embodiment. A process illustrated in FIG. 17 is a process to be executed by the reproduction device 150 illustrated in FIG. 1, and a process for estimating the spectral reflectivity of the object from the received light including the reflected light from the object in a case where the light is radiated to the object in the visible light communication by obtaining the fourth embodiment illustrated in FIG. 15. The process illustrated in FIG. 17 is started by a process 1700.

A process 1702 for averaging the received light by n cycle time is executed by the estimation unit 1600. In the process 1702, similar to the description with reference to FIG. 15, the average value of the reception values at each sampling point in n cycle time for the received light which is received by the reproduction device 150 and in which the information is embedded in the color-difference signals of the U component and the V component of YUV color space, for example, is calculated.

By comparing the averaged received light and the spectral distribution of the transmitted light, a process 1704 for estimating the reflectivity coefficient is executed by the estimation unit 1600. In the process 1704, similar to the description with reference to FIG. 15, by comparing the averaged received light and the transmitted light having the known spectral distribution by the process 1702, the reflectivity coefficients α, β, and γ for correcting the conversion coefficients in the conversion equations when converting from the RGB color space to the YUV color space.

A process 1706 for correcting the received light based on the estimated reflectivity coefficient is executed by the correction unit 1610. In the process 1706, the value of each component of RGB color space of the received light is corrected using the reciprocals of the reflectivity coefficients α, β, and γ estimated by the process 1704.

Next, a process 1708 for generating the signal in the YUV color space from the corrected received light is executed by the generation unit 1620. A process 1710 for acquiring the specific information based on the generated signal is executed by the acquisition unit 1630.

Next to the process 1710, in a case where the acquired specific information is information for specifying the other information to be desired to acquire in the reproduction device 150 as illustrated in FIG. 1, for example, the specific information is an ID for specifying the other information, or is information for specifying the URL for acquiring the other information, a process in which the ID or the URL corresponding to the specific information 125 is designated and accesses to the server device 170 in which the other information is held, and the other information is acquired as a response from the server device 170 corresponding to the access may be executed by the acquisition unit 1640. Furthermore, charging in a case where the other information is acquired from the server device 170 may be issued.

By the process 1712, the process illustrated in FIG. 17 is ended.

According to the above-described fourth embodiment, the reflectivity coefficient for correction the conversion coefficient in the conversion equation from the RGB color space to the YUV color space can be estimated in the visible light communication. The method of the fourth embodiment may be applied to the process 1304 or the process 1404 of the third embodiment.

In FIG. 17, an example in which the received light is averaged by n cycle time is illustrated. The invention is not limited thereto. For example, in (A) of FIG. 15, the spectral reflectivity and the correction value may be estimated using a first sampling point at which the signal is received, and the received light may be converted using the same correction value as the correction value estimated from the first sampling point at the later sampling point.

Figure 18:
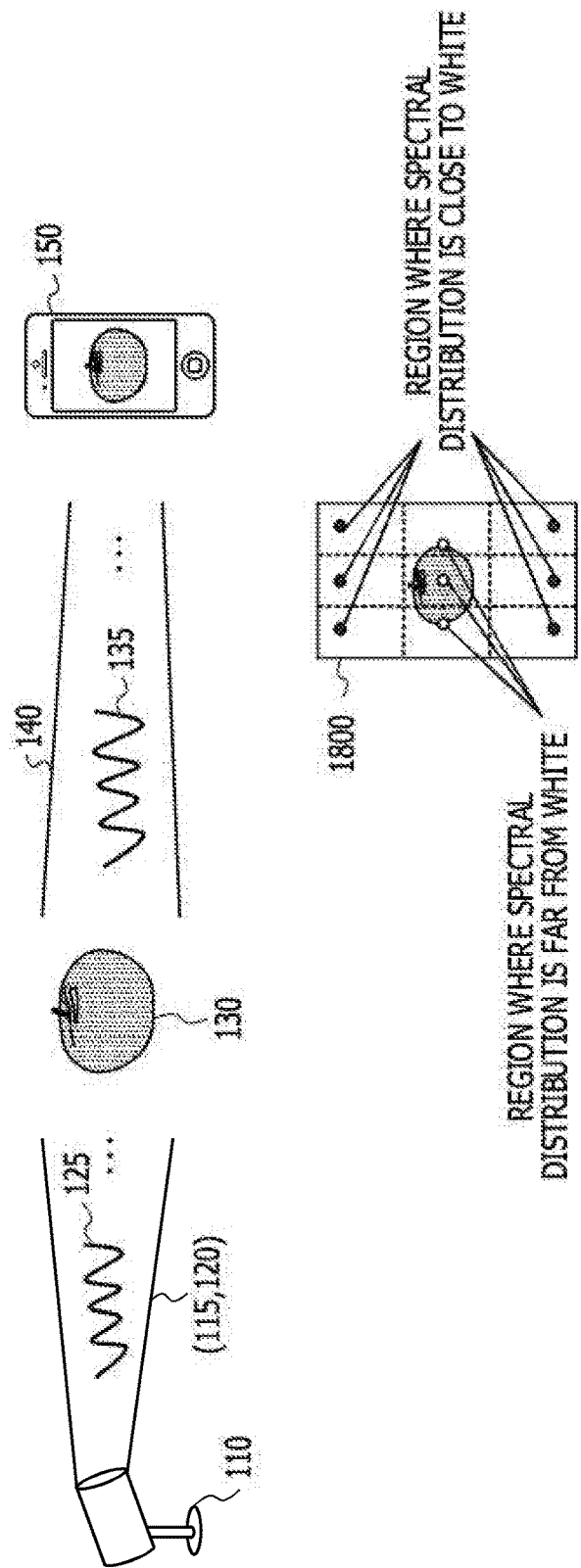
FIG. 18 illustrates a fifth embodiment.

FIG. 18 illustrates a fifth embodiment. An outline of the fifth embodiment will be described with reference to FIG. 18. In the fifth embodiment, in the illuminating device 110, the specific information is embedded in the light (for example, white) having the known spectral distribution. As illustrated in FIG. 18, the specific object 130 is irradiated with the light emitted from the illuminating device 110.

In the reproduction device 150 receiving the light including the reflected light from the object 130, in a case where the object 130 is imaged with the camera based on the received light, an image 1800 including the object is divided into a plurality of regions.

From the fact that the light having the known spectral distribution is used as the transmitted light, the received light is analyzed by comparing the transmitted light and the received light for each of the plurality of regions and selecting the region, in which the received light having the spectral distribution closer than the spectral distribution of the transmitted light is obtained, as a priority. In addition, the received light is analyzed by assigning a large amount of the weight to the region in which the received light having the spectral distribution closer than the spectral distribution of the transmitted light is obtained.

According to the fifth embodiment, since the specific information can be reproduced using the received light with less influence due to the spectral reflectivity of the object, reliability of the reproduced information is improved. In addition, even when a plurality of objects having the different spectral reflectivities are present in the imaged angular field, it is possible to suppress the influence of reflection due to objects having the spectral reflectivity that causes the interference in the component with each other.

Figure 19:
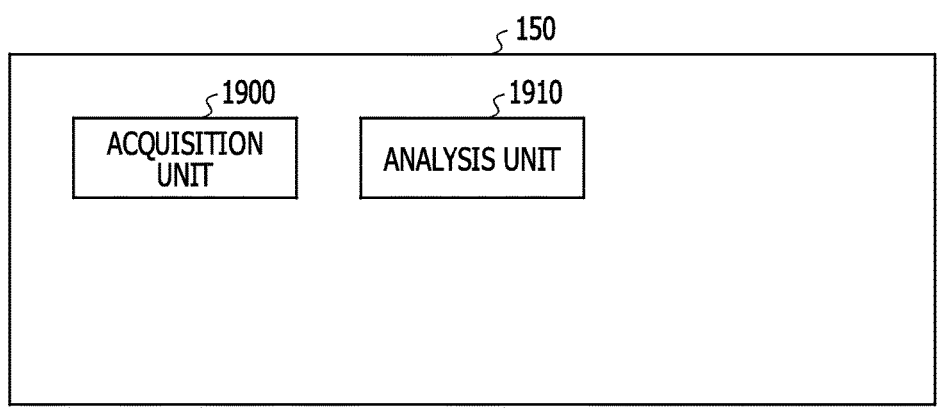
FIG. 19 illustrates a functional block of the fifth embodiment.

FIG. 19 illustrates a functional block of the fifth embodiment. As illustrated in FIG. 19, the reproduction device 150 illustrated in FIG. 1 serves as an acquisition unit 1900 and an analysis unit 1910 by executing a program loaded on RAM of the reproduction device 150 by the CPU of the reproduction device 150 to be used as a working memory. The functional units are functional blocks for obtaining the fifth embodiment described with reference to FIG. 18. Processes to be executed by these functional units will be described with reference to FIGS. 20 and 21, and a hardware configuration obtaining these functional units will be described with reference to FIG. 21.

Figure 20:
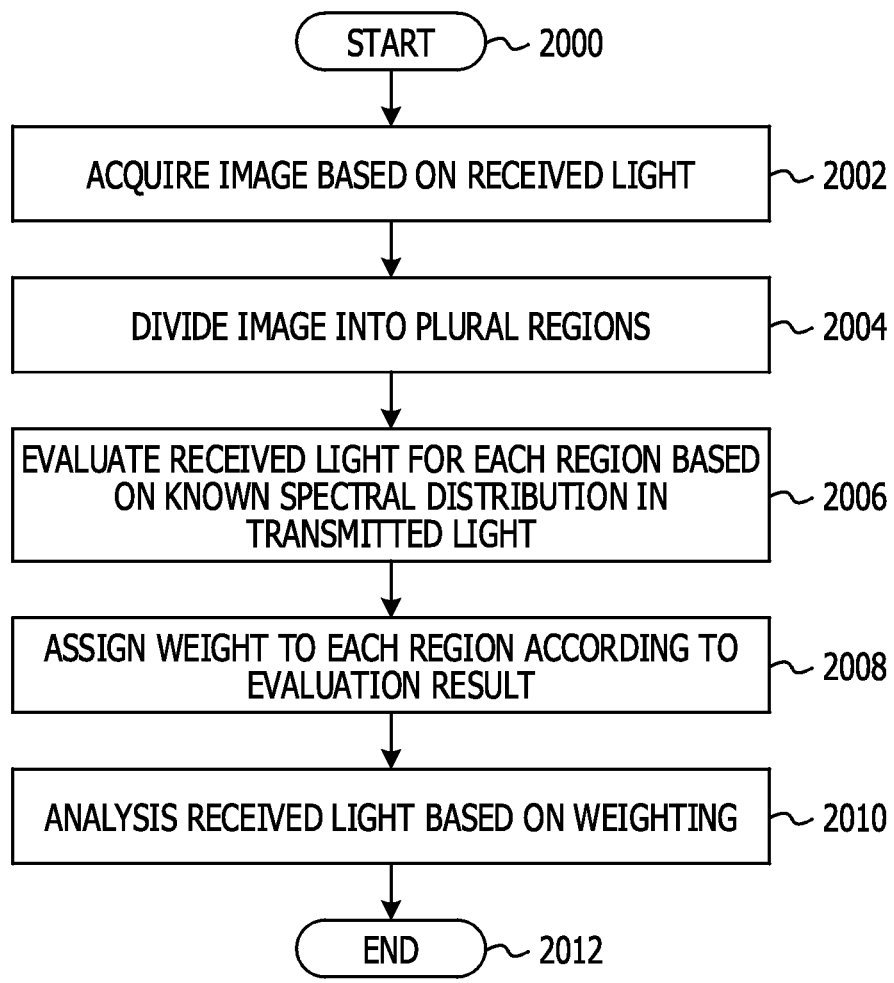
FIG. 20 illustrates a process of the fifth embodiment.

FIG. 20 illustrates a process of the fifth embodiment. A process illustrated in FIG. 20 is a process to be executed by the reproduction device 150 illustrated in FIG. 1, and a process for reproducing the specific information such that the influence due to the spectral reflectivity of the object is reduced by obtaining the fifth embodiment illustrated in FIG. 18. The process illustrated in FIG. 20 is started by a process 2000.

A process 2002 for acquiring the image based on the received light is executed by the acquisition unit 1900. In the process 2002, for example, the received light is received by the imaging unit (camera) included in the reproduction device 150 and acquires the image which is imaged by receiving the light.

A process 2004 for dividing the acquired image into a plurality of regions is executed by the analysis unit 1910. In the process 2004, as illustrated in FIG. 18, the image acquired by the process 2002 is divided into a plurality of regions.

A process 2006 for evaluating the received light for each region based on the known spectral distribution in the transmitted light is executed by the analysis unit 1910. In the process 2006, by comparing each received light received in the region and the known spectral distribution in the transmitted light for each of the plurality of regions generated by the process 2004, the degree of similarities of the spectral distribution of each of the received light for each region and the known spectral distribution is evaluated. For obtaining the spectral distribution for each region, for example, it is considered to use an average pixel value in the region. In addition, similar to the third embodiment, an example of the evaluation method of the degree of similarity will be described.

For example, a value normalized such that a becomes 1 in the estimated reflectivity coefficients ($\alpha$, $\beta$, $\gamma$) is defined as ($\alpha'$, $\beta'$, $\gamma'$), and a value normalized such that r becomes 1 in the value (r, g, b) of each component in the RGB color space in the spectral distribution of the light to be radiated to the object or the light being radiated to the object is defined as (r', g', b'). In this case, the degree of similarity $\mu$ is represented by Equation (25).

$$\mu = [\{(\alpha'-r')^2 - (\beta'-g')^2\} | \{(\alpha'-r')^2 + (\gamma'-b')^2\} + \{(\beta'-g')^2 | (\gamma'-b')^2\}]^{-1} \quad (25)$$

The invention is not limited the method, and the other method for evaluating the degree of similarity $\mu$ of ($\alpha$, $\beta$, $\gamma$) and (r, g, b) may be used.

A process 2008 for analyzing the received light according to the evaluation result is executed by the analysis unit 1910. In the process 2008, a weight is assigned to the region according to the degree of the similarity of each region, which is evaluated by the process 2006, for each region. For example, a great weight is assigned to the region in which the degree of similarity is greater than the threshold value for the preferentially considering the region. On the other hand, a small weight is assigned to a region in which the degree of similarity is smaller than the threshold value. If the weight to be assigned to the region in which the degree of similarity is small is set to 0, only the region in which the degree of similarity is great can be selected.

A process 2010 for analyzing the received light based on the weighting is executed by the analysis unit 1910. In the process 2010, according to the received lights in the plurality of region weighted by the process 2008, the interference matrix is obtained in the same manner as the above-described embodiments, the received light is analyzed by correcting the received light by the interference matrix, and the specific information is reproduced from the corrected received light and acquired.

Next to the process 2010, in a case where the acquired specific information is information for specifying the other information to be desired to acquire in the reproduction device 150 as illustrated in FIG. 1, for example, the specific information is an ID for specifying the other information, or is information for specifying the URL for acquiring the other information, a process in which the ID or the URL corresponding to the specific information 125 is designated and accesses to the server device 170 in which the other information is held, and the other information is acquired as a response from the server device 170 corresponding to the access may be executed by the analysis unit 1910. Furthermore, charging in a case where the other information is acquired from the server device 170 may be issued.

By the process 2012, the process illustrated in FIG. 20 is ended.

According to the fifth embodiment, since the specific information can be reproduced using the received light with less influence due to the spectral reflectivity of the object, reliability of the reproduced information is improved.

FIG. 21 illustrates a hardware configuration of a reproduction device and an illuminating device of an example. The reproduction device 150 and the illuminating device 110 illustrated in FIG. 1 have a configuration of a general computer 2100 illustrated in FIG. 21. In an example, in order to simplify the explanation, the reproduction device 150 and the illuminating device 110 will be collectively described with reference to FIG. 21. Therefore, if the reproduction device 150 and the illuminating device 110 have different hardware to each other, the hardware will be described using the same reference numeral (for example, a CPU 2102). Furthermore, as described below, even in a configuration included in any one of the reproduction device 150 or the illuminating device 110, the configurations which are collectively illustrated in FIG. 21 will be described.

The computer 2100 includes a central processing unit (CPU) 2102, a read only memory (ROM) 2104, and a random access memory (RAM) 2106. The computer 2100 further includes a hard disk device 2108, an input device 2110, an output device 2112, an interface device 2114, and a recording medium driving device 2116. In a case of the reproduction device 150 may include an imaging device 2122 and a projection device (projector) 2124. On the other hand, in a case of the illuminating device 110, a light emitting device 2126 having a plurality of light emitting element (LED) for emitting the light in the visible light communication for superimposing the information on the light as described above is included.

The above-described configuration elements are coupled to each other through a bus 2120 and various types of data items are mutually received and transmitted under the supervision of the CPU 2102.

The CPU 2102 is an arithmetic processing unit for controlling overall operations of the computer 2100 and serves as a control processing unit of the computer 2100.

The ROM 2104 is a read-only semiconductor memory in which a predetermined basic control program is recorded in advance. The CPU 2102 reads and executes the basic control program at the time when the computer 2100 is activated, whereby enabling operation control of each configuration element of the computer 2100.

The RAM 2106 is a semiconductor memory, on which writhing and reading can be performed at any time, to be used as a working storage area as occasion calls when the CPU 2102 executes the various types of control programs.

In a case of the reproduction device 150, a program for executing the processes illustrated in FIGS. 7, 10, 13, 14, 17, and 20 are loaded on the RAM 2106, and by executing the program by the CPU 2102, the reproduction device 150 obtains the functions illustrated in FIGS. 6, 9, 12, 16, and 19 according to the processes.

The hard disk device 2108 is a storage device for storing various types of control programs to be executed by the CPU 2102 or various types of data items. The CPU 2102 performs various types of control processes to be described by reading and executing the predetermined control program stored in the hard disk device 2108.

The input device 2110 is, for example, a mouse device or a keyboard device. When the input device 2110 is operated by a user of the computer 2100, input of various types of information items in association with the operation content is acquired and the acquired input information is sent to the CPU 2102.

The output device 2112 is, for example, a liquid crystal display, and displays various types of texts or images according to the display data transmitted from the CPU 2102.

The interface device 2114 manages the reception of the various type of information items between various apparatuses coupled to the computer 2100. The interface device 2114 is, for example, a network interface card (NIC).

The recording medium driving device 2116 is a device for reading various types of control programs recorded in a portable recording medium 2118 or data items. The CPU 2102 can perform various types of control processes to be described by reading and executing a predetermined program recorded in the portable recording medium 2118 through the recording medium driving device 2116. Examples of the portable recording medium 2118 include a flash memory included in a connector of a universal serial bus (USB) standard, a compact disc read only memory (CD-ROM), a digital versatile disc read only memory (DVD-ROM), or the like.

The imaging device 2122 includes an image sensor formed by a two-dimensional array of a solid state imaging element having sensitivity of the light emitted from the illuminating device 110 such as a CCD or a CMOS, and an imaging optical system for imaging an image in an imaging range above the image sensor. When the imaging device 2122 receives an imaging instruction in a period when the received light is received, imaging is executed at a predetermined imaging rate (for example, 30 frame/sec), and an image is generated for every imaging.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reproduction device configured to receive light emitted based on a plurality of signals having a specific amplitude in accordance with a specific color space on which information is superimposed, respectively, and to reproduce the information based on the received light, the reproduction device comprising:
    a memory; and
    a processor coupled to the memory and configured to:
        generate each of the plurality of signals in the specific color space from the received light, the plurality of signals having the specific amplitude and a preamble which is a predetermined specific reference signal,
        correct the generated plurality of signals based on the specific amplitude and a matrix to be obtained based on a comparison between the preamble and the specific reference signal, and
        acquire the information based on the corrected plurality of signals.

2. The reproduction device according to claim 1, wherein the processor is configured to correct amplitudes of the generated plurality of signals according to a specific ratio in a case where each of amplitudes of the generated plurality of signals is determined by combining a plurality of color components in the specific color space at the specific ratio according to the specific amplitude.

3. The reproduction device according to claim 1, further comprising:
    a camera configured to image the object by the received light,
    wherein the processor is configured to correct the plurality of signals generated from the received light received in association with imaging of the object by the camera.

4. The reproduction device according to claim 3, wherein the processor is configured to:
- divide an image which is obtained by imaging the object into a plurality of regions, and
- assign a weight to the plurality of regions according to a predetermined degree of similarity with respect to the spectral distribution of the emitted light, in which the spectral distribution is predetermined, of each received light for each of the plurality of regions.

5. The reproduction device according to claim 1, wherein the received light includes a reflected light in a case where the object having the specific spectral reflectivity is irradiated with the emitted light.

6. The reproduction device according to claim 1, wherein
- the information which is acquired is information associated with the object having the specific spectral reflectivity in which the emitted light is radiated, and
- the reproduction device includes a display device configured to display the specified information by the information associated with the object.

7. The reproduction device according to claim 1, wherein
- the information which is acquired is information associated with the object having the specific spectral reflectivity in which the emitted light is radiated, and
- the reproduction device includes a projector configured to project the information specified by the information associated with the object.

8. The reproduction device according to claim 1, wherein the information is superimposed on the plurality of signals by modulating phases of the plurality of signals having the specific amplitude.

9. The reproduction device according to claim 1, wherein the received light includes a plurality of color components generated by performing specific conversion on the plurality of signal on which the information is superimposed.

10. A reproduction device configured to receive light emitted based on a plurality of signals in accordance with a specific color space on which information is superimposed, respectively, and to reproduce the information based on the received light, the reproduction device comprising:
- a memory; and
- a processor coupled to the memory and configured to:
  - estimate each of a spectral reflectivity of an object that reflects the emitted light by comparing a spectral distribution of the received light and a known spectral distribution,
  - correct the received light based on the estimated spectral reflectivity of the object, and
  - acquire the information based on the corrected amplitudes of the received light.

11. The reproduction device according to claim 10, wherein the processor is configured to:
- generate a plurality of signals in the specific color space from the received light, and
- correct the received light by correcting the generated plurality of signals based on the estimated spectral reflectivity of the object.

12. The reproduction device according to claim 10, wherein the processor is configured to:
- correct the received light by correcting each component in a case where the received light is represented by the other color space based on the estimated spectral reflectivity of the object,
- generate a plurality of signals in the specific color space from each of the corrected components, and
- acquire the information based on the generated plurality of signals.

13. The reproduction device according to claim 11, wherein the processor is configured to compare the spectral distribution of the received light and the known spectral distribution by comparing each component in the other color space in a case where the known spectral distribution is represented by the other color space and each component in the other color space in a case where the received light is represented by the other color space and estimates the spectral reflectivity of the object.

14. The reproduction device according to claim 11, wherein the processor is configured to estimate a reflectivity coefficient of each of the components in the other color space as the spectral reflectivity of the object by comparing an average value of the spectral distributions in a specific period in the received light and the spectral distribution of the emitted light in which the spectral distribution is predetermined.

15. The reproduction device according to claim 14, wherein the processor is configured to correct the generated plurality of signals based on a reciprocal of the estimated reflectivity coefficient or an inverse ratio of the estimated reflectivity coefficient.

16. The reproduction device according to claim 14, wherein the processor is configured to correct each component in a case where the received light is represented by the other color space based on a reciprocal of the estimated reflectivity coefficient or an inverse ratio of the estimated reflectivity coefficient.

17. A method of receiving light emitted based on a plurality of signals having a specific amplitude in accordance with a specific color space on which information is superimposed, respectively, and reproducing the information based on the received light, the method comprising:
- generating each of the plurality of signals in the specific color space from the received light, the plurality of signals having the specific amplitude and a preamble having a predetermined specific reference signal;
- correcting, by a processor, the generated plurality of signals based on the specific amplitude and a matrix to be obtained based on a comparison between the preamble and the specific reference signal; and
- acquiring the information based on the corrected plurality of signals.

18. A non-transitory storage medium for storing a program that causes a computer to execute a process, the computer being configured to receive light emitted based on a plurality of signals having a specific amplitude in accordance with a specific color space on which information is superimposed, respectively, and to reproduce the information based on the received light, the process comprising:
- generating each of the plurality of signals in the specific color space from the received light;
- correcting the generated plurality of signals based on the specific amplitude and a matrix to be obtained based on a comparison between the preamble and the specific reference signal; and
- acquiring the information based on the corrected plurality of signals.

19. A system comprising:
- a light device including a light source configured to emit light based on a plurality of signals having a specific amplitude in accordance with a specific color space, information being superimposed on the plurality of signals, respectively;

a reproduction device including:
  a receiver configured to receive the emitted light; and
  a processor coupled to the receiver and configured to:
    generate each of the plurality of signals in the specific color space from the received light, the plurality of signals having the specific amplitude and a preamble having a predetermined specific reference signal,
    correct the generated plurality of signals based on the specific amplitude and a matrix to be obtained based on a comparison between the preamble and the specific reference signal, and
    acquire the information based on the corrected plurality of signals; and
  a device configured to provide relevant information according to the acquired information.

* * * * *